(12) United States Patent
Kojima et al.

(10) Patent No.: US 9,856,801 B2
(45) Date of Patent: Jan. 2, 2018

(54) CONTROL DEVICE OF VEHICLE

(71) Applicant: TOYOTA JIDOSHA KABUSHIKI KAISHA, Toyota-shi, Aichi (JP)

(72) Inventors: Susumu Kojima, Toyota (JP); Yusuke Suzuki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 134 days.

(21) Appl. No.: 15/046,047

(22) Filed: Feb. 17, 2016

(65) Prior Publication Data

US 2016/0245196 A1 Aug. 25, 2016

(30) Foreign Application Priority Data

Feb. 19, 2015 (JP) .................................. 2015-030170

(51) Int. Cl.
| | | |
|---|---|---|
| F02B 43/00 | (2006.01) |
| F02D 37/02 | (2006.01) |
| F01N 3/10 | (2006.01) |
| F02D 41/30 | (2006.01) |
| F02D 41/12 | (2006.01) |
| F02D 41/06 | (2006.01) |
| F02D 41/04 | (2006.01) |
| F02N 11/08 | (2006.01) |
| F02D 41/02 | (2006.01) |

(52) U.S. Cl.
CPC ............ *F02D 37/02* (2013.01); *F01N 3/101* (2013.01); *F02D 41/042* (2013.01); *F02D 41/065* (2013.01); *F02D 41/123* (2013.01); *F02D 41/3005* (2013.01); *F02N 11/0844* (2013.01); *F02D 41/0235* (2013.01); *Y02T 10/48* (2013.01)

(58) Field of Classification Search
CPC .............. F02N 11/0844; F02N 99/006; F02N 2019/008; Y02T 10/48
USPC ..... 123/1 A, 179.4, 406.24, 406.26; 701/102
See application file for complete search history.

(56) References Cited

U.S. PATENT DOCUMENTS

| | | | |
|---|---|---|---|
| 2003/0163243 A1* | 8/2003 | Inoue ................... | F02D 41/042 701/112 |
| 2006/0212212 A1* | 9/2006 | Akasaka ............. | F02D 41/0002 701/112 |
| 2008/0072860 A1* | 3/2008 | Nakamura .......... | F02D 41/0225 123/179.4 |
| 2012/0035829 A1* | 2/2012 | Mitani ................... | F01N 3/043 701/102 |

(Continued)

FOREIGN PATENT DOCUMENTS

| | | |
|---|---|---|
| EP | 2525065 A1 | 11/2012 |
| JP | 2005-240568 A | 9/2005 |

(Continued)

*Primary Examiner* — John Kwon
*Assistant Examiner* — James Kim
(74) *Attorney, Agent, or Firm* — Andrews Kurth Kenyon LLP

(57) ABSTRACT

The invention relates to a control device of a vehicle provided with a multi-cylinder internal combustion engine comprising a catalyst in an exhaust passage. When a state of an ignition switch has been changed from an on-state to an off-state and a rotation of the engine has stopped, the control device causes a fuel injector to inject fuel into a combustion chamber of a particular cylinder in which an intake valve is closed and an exhaust valve is open and causes an ignition device to ignite the fuel.

7 Claims, 18 Drawing Sheets

(56) References Cited

U.S. PATENT DOCUMENTS

2012/0130619 A1* 5/2012 Hozumi ............... F02D 41/042
  701/102
2013/0000599 A1 1/2013 Okamoto et al.

FOREIGN PATENT DOCUMENTS

| JP | 2007-023815 A | 2/2007 |
| JP | 2008-309008 A | 12/2008 |
| JP | 2010-116154 A | 5/2010 |
| JP | 2010-138750 A | 6/2010 |
| JP | 2011-144730 A | 7/2011 |
| JP | 2013-015022 A | 1/2013 |
| JP | 2015-031166 A | 2/2015 |

* cited by examiner

CONTROL DEVICE OF VEHICLE

BACKGROUND OF THE INVENTION

Field of the Invention

The invention relates to a control device of a vehicle provided with a multi-cylinder internal combustion engine for controlling fuel injections and fuel ignitions.

Description of the Related Art

A four-cycle piston-reciprocating in-cylinder-injection (direct-injection) spark-ignition gasoline internal combustion engine is described in JP 2005-240568 A. This gasoline engine (hereinafter, will be referred to as "the conventional engine") is configured to inject fuel from a fuel injector into a cylinder in which exhaust valves are closed after an operation of the engine stops (i.e., after a rotation of the engine stops).

Thereby, fuel is prevented from leaking from the fuel injectors into combustion chambers during the stop of the engine operation by decreasing a pressure of fuel supplied to the fuel injectors (i.e., a fuel pressure) to below a predetermined pressure.

SUMMARY OF THE INVENTION

In the conventional engine, fuel injected from the fuel injector after the stop of the engine operation is expected to be discharged from the combustion chamber to an exhaust passage by natural convection. However, the fuel is not sufficiently discharged from the combustion chamber only by natural convection and thus, if fuel remains in the combustion chamber, an exhaust emission property may decrease upon the next engine start.

The present invention solves the aforementioned problem. In other words, one of objects of the present invention is to provide a control device of an internal combustion engine for sufficiently discharging fuel, which is injected from a fuel injector to decrease a fuel pressure after the stop of the engine operation, to an exhaust passage to purify the fuel by a catalyst.

A control device according to the present invention (hereinafter, will be referred to as "the invention device") is applied to a vehicle. The vehicle comprises a multi-cylinder internal combustion engine (10).

The engine (10) has:
at least two combustion chambers (25),
at least two fuel injectors (39) provided corresponding to the combustion chambers (25), respectively, each of the fuel injectors (39) injecting fuel directly into the corresponding combustion chamber (25),
at least two ignition devices (35) provided corresponding to the combustion chambers (25), respectively, each of the ignition devices (35) including an ignition plug (37),
at least two intake valves (32) provided corresponding to the combustion chambers (25), respectively,
at least two exhaust valves (34) provided corresponding to the combustion chambers (25), respectively, and
an exhaust passage (33, 51, 52) connected to the combustion chambers (25).

The vehicle further comprises an ignition switch (79) and a catalyst (53) provided in the exhaust passage (33, 51, 52). The catalyst (53) has an oxidation function.

The invention device comprises a control section (80) for controlling fuel injections carried out by the fuel injectors (39) and fuel ignitions carried out by the ignition devices (35).

The control section (80) is configured to execute a first control when a particular execution condition is satisfied. The particular execution condition is a condition that a state of the ignition switch (79) has been changed from an on-state to an off-state and a rotation of the engine (10) has stopped. The first control is a control for causing the fuel injector (39) to inject fuel into the combustion chamber (25) of a particular cylinder in which the intake valve (32) is closed and the exhaust valve (34) is open and causing the ignition device (35) to ignite the fuel.

According to the first control executed by the invention device, fuel is injected into the combustion chamber of the particular cylinder when the particular execution condition is satisfied. At this time, since the engine does not rotate, no fuel is supplied to the fuel injectors. Therefore, in case that there is a possibility that an operation of the engine (hereinafter, will be referred to as "the engine operation") has stopped for a long time after the state of the ignition switch is changed to the off-state, a pressure of fuel supplied to the fuel injectors (hereinafter, this pressure will be referred to as "the fuel pressure") is decreased. Thus, the fuel is prevented from leaking from the fuel injectors into the combustion chambers during the stop of the engine operation.

Further, the fuel injected from the fuel injector by the first control is ignited by the ignition device to burn. At this time, in the particular cylinder, the intake valve is closed and the exhaust valve is open. Therefore, a combustion gas produced by the burning of the fuel flows out from the combustion chamber to the exhaust passage due to an expansion of a volume of the combustion gas. Thus, even when fuel is injected from the fuel injector for decreasing the fuel pressure after the stop of the engine operation, the fuel can be sufficiently discharged to the exhaust passage.

In addition, in the engine, to which the invention device is applied, the catalyst having an oxidation function is provided in the exhaust passage. Immediately after the state of the ignition switch is changed from the on-state to the off-state, a temperature of the catalyst is high and thus, the catalyst is activated. Therefore, the combustion gas flowing into the catalyst can be purified by the catalyst. Thus, even when fuel is injected from the fuel injector by the first control, an exhaust emission property can be prevented from being decreased.

Further, according to another aspect of the present invention, in case that the vehicle further comprises a brake pedal (92), the control section (80) may be configured to execute an engine stop control for causing the fuel injectors (39) to stop injections of fuel to stop a rotation of the engine (10) when an engine stop condition is satisfied, the engine stop condition being a condition that the state of the ignition switch (79) corresponds to the on-state, the brake pedal (92) is depressed and a speed of the vehicle is equal to or smaller than a predetermined speed.

In this case, the control section (80) may be configured to determine that the particular execution condition is satisfied when the state of the ignition switch (79) is changed from the on-state to the off-state after the rotation of the engine (10) stops.

Further, according to another aspect of the present invention, the control section (80) may be configured to start the operation of the engine (10) by causing the fuel injector (39) to inject fuel into the combustion chamber (25) of a cylinder, a stroke of which corresponds to a combustion stroke, and the ignition device (35) to ignite the fuel when a start of the operation of the engine (10) is requested after the start of the engine stop control and before the rotation of the engine (10) stops.

In this case, the control section (80) may be configured to execute a fuel pressure increase control for increasing a fuel pressure when the engine stop condition is satisfied, the fuel pressure being a pressure of fuel supplied to the fuel injectors (39).

According to this aspect, when the start of the engine operation is requested after the engine stop condition is satisfied and before the rotation of the engine becomes zero, the fuel pressure is increased. Thus, a sufficient amount of fuel can be injected into the combustion chamber of the cylinder, the stroke of which corresponds to the combustion stroke. In addition, when the engine operation stops, that is, the rotation of the engine becomes zero without any request of the start of the engine operation, the high fuel pressure is decreased by the first control. Thereby, the engine operation can be assuredly started without using a starter motor and fuel is prevented from leaking from the fuel injectors into the combustion chambers.

Further, according to another aspect of the present invention, the control section (80) may be configured to execute the first control to cause the fuel injector (39) to inject an amount of fuel determined on the basis of an amount of air in the combustion chamber (25) of the particular cylinder.

If the amount of fuel injected by the first control is excessively small or large with respect to the amount of air in the combustion chamber of the particular cylinder, an air-fuel ratio of a mixture gas formed in the combustion chamber of the particular cylinder may be outside of a burnable range and as a result, a desired combustion may not be obtained. In this regard, according to the aforementioned aspect, the amount of fuel injected by the first control can be determined such that the fuel can be assuredly burned.

Further, according to another aspect of the present invention, the control section (80) may be configured:

to execute the first control when the particular execution condition is satisfied and a fuel pressure, which is a pressure of the fuel supplied to the fuel injectors (39), is higher than a permissible fuel pressure; and not to execute the first control when the particular execution condition is satisfied and the fuel pressure is equal to or lower than the permissible fuel pressure.

According to this aspect, when the fuel pressure is equal to or lower than the permissible fuel pressure and thus, there is a small possibility that the fuel leaks from the fuel injectors into the combustion chambers during the stop of the engine operation, unneeded execution of the first control, that is, unneeded fuel injections and fuel ignitions can be prevented.

Further, according to another aspect of the present invention, the control section (80) may be configured to execute a second control when the control section (80) predicts that the fuel pressure after the execution of the first control is higher than a permissible fuel pressure, the second control being a control for causing the fuel injector (39) to inject an amount of the fuel capable of decreasing the fuel pressure to below the permissible fuel pressure at a predetermined timing capable of causing the fuel injected from the fuel injector (39) by the first control to move into a flow of a combustion gas produced by a burning of the fuel to the exhaust passage (33, 51, 52) without blowing off the burning of the fuel.

According to this aspect, when the fuel pressure cannot be sufficiently decreased only by the first control, the fuel pressure can be decreased to below the permissible fuel pressure by the second control. In addition, the fuel injected by the second control can be assuredly discharged to the exhaust passage by setting the timing of injecting fuel by the second control to a suitable timing.

According to another aspect of the present invention, the control section (80) may be configured to determine, as the predetermined timing, a timing within a particular period including a timing of completion of the burning of the fuel injected from the fuel injector (39) by the first control.

According to this aspect, the fuel is injected by the second control at a timing around a timing, at which the flow of the combustion gas produced by the burning of the fuel injected by the first control is the strongest flow. Therefore, the fuel injected by the second control can be assuredly discharged to the exhaust passage.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

Below, a control device of an internal combustion engine according to an embodiment of the present invention will be described with reference to the drawings.

Figure 1:
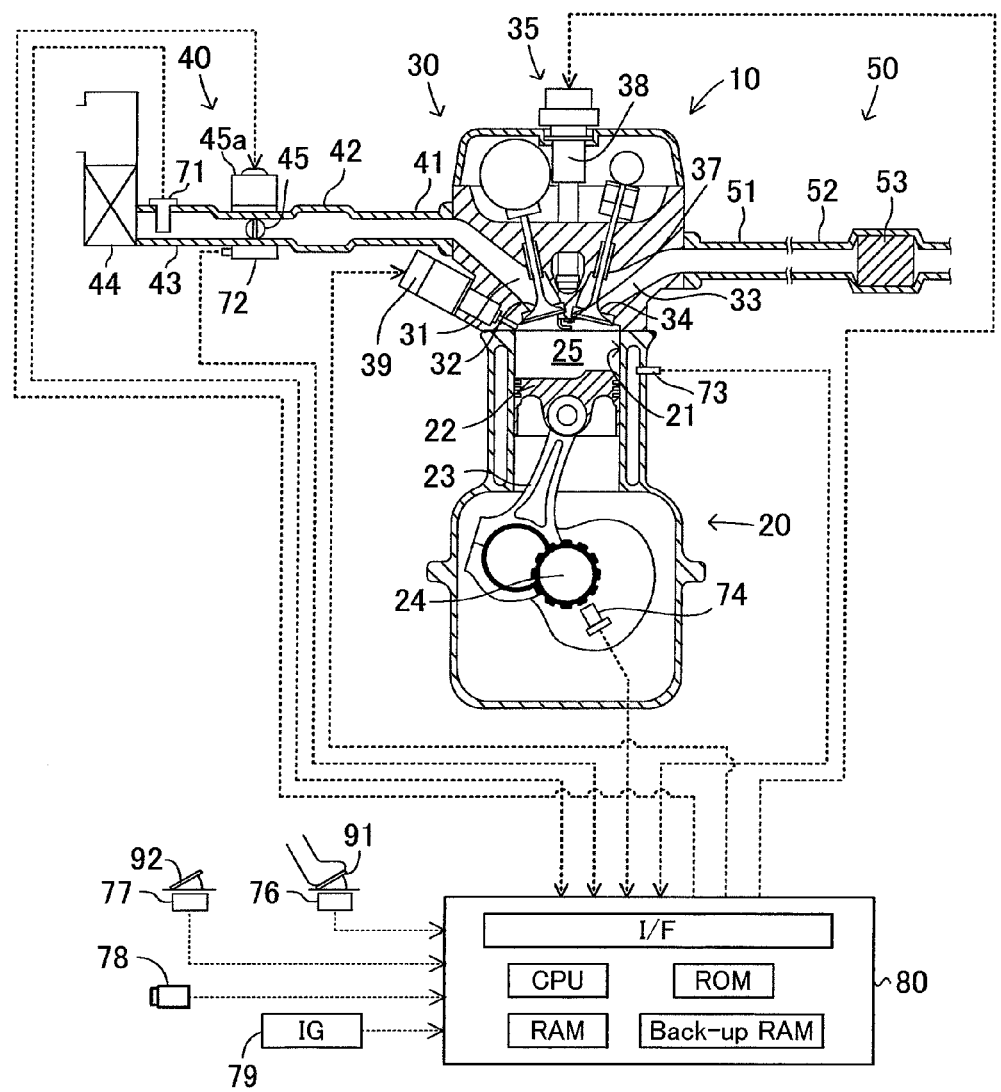
FIG. 1 shows a general view of an internal combustion engine provided with a control device according to an embodiment of the present invention.
Figure 2:
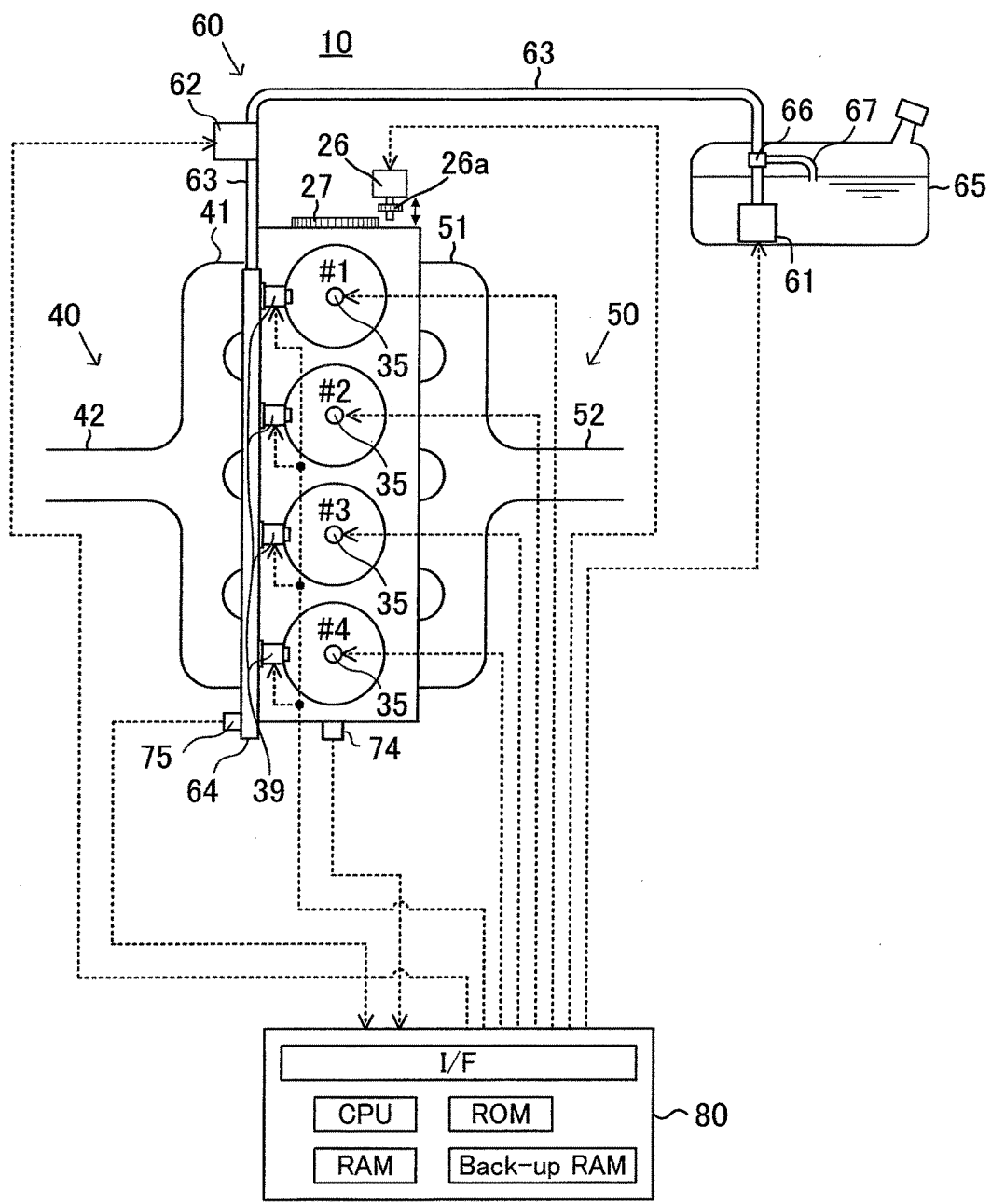
FIG. 2 shows a plan view of the engine shown in FIG. 1.

The present control device is applied to an internal combustion engine 10 shown in FIGS. 1 and 2. The engine 10 is a multi-cylinder (in this embodiment, a linear-four-cylinder) four-cycle piston-reciprocating in-cylinder-injection (direct-injection) spark-ignition type gasoline engine.

The engine 10 includes a cylinder block part 20, a cylinder head part 30, an intake system 40 and an exhaust system 50. The cylinder block part 20 includes a cylinder block lower case, an oil pan and the like. The cylinder head part 30 is mounted on the cylinder block part 20. The intake system 40 serves to supply an air to the cylinder block part 20. The exhaust system 50 serves to discharge an exhaust gas from the cylinder block part 20 to the outside air. Further, as shown in FIG. 2, the engine 10 includes a fuel supply system 60 for supplying fuel to the cylinder block part 20.

As shown in FIG. 1, the cylinder block part 20 includes cylinders 21, pistons 22, connection rods 23 and a crank shaft 24. The respective pistons 22 move reciprocally in the respective cylinders 22. The reciprocal movements of the respective pistons 22 are transmitted to the crank shaft 24 via the respective connection rods 23 and thereby, the crank shaft 24 is caused to be moved. The respective cylinders 21, the respective pistons 22 and the cylinder head part 30 forms respective combustion chambers (i.e., respective cylinders) 25.

Further, as shown in FIG. 2, the cylinder block part 20 includes a starter motor 26. The starter motor 26 drives in response to a command supplied by an engine ECU (an engine electronic control unit) 80 described later to mesh a pinion gear 26a to a ring gear 27 secured to the crank shaft 24, thereby to rotate the ring gear 27. The rotation of the ring gear 27 supplies the crank shaft 24 with rotation torque and thereby, the crank shaft 24 is caused to be rotated.

The starter motor 26 of this embodiment is a type of a starter motor which starts the rotating of the pinion gear 26a as well as the meshing of the pinion gear 26a with the ring gear 27 simultaneously when the drive of the starter motor 26 is started.

Again, referring to FIG. 1, the cylinder head part 30 includes intake ports 31, intake valves 32, exhaust ports 33, exhaust valves 34, ignition devices 35 and fuel injectors 39. The respective intake ports 31 are connected in communication with the respective combustion chambers 25. The respective intake valves 32 open and close the respective intake ports 31. The respective exhaust ports 33 are connected in communication with the respective combustion chambers 25. The respective exhaust valves 34 open and close the exhaust ports 33. The respective ignition devices 35 ignite fuel in the respective combustion chambers 25. The respective fuel injectors 39 inject fuel directly into the respective combustion chambers 25.

Each of the ignition devices 35 includes an ignition plug 37 and an igniter 38 including an ignition coil for generating high voltage to be supplied to the ignition plug 37. The igniter 38 is configured to generate high voltage by using the ignition coil in response to a command supplied by the ECU 80 described later. This high voltage is supplied to the ignition plug 37 and the ignition plug 37 produces spark.

The fuel injectors 39 are provided in the cylinder head part 30 such that fuel injection holes of the respective fuel injectors 39 expose to the interiors of the respective combustion chambers 25. The respective fuel injectors 39 are configured to open in response to commands supplied by the ECU 80 described later to inject fuel directly into the respective combustion chambers 25.

The intake system 40 includes an intake manifold 41, a surge tank 42 and an intake pipe 43. The intake manifold 41 is connected in communication with the intake ports 31. The surge tank 42 is connected in communication with the intake manifold 41. One end of the intake pipe 43 is connected in communication with the surge tank 42. The intake ports 31, the intake manifold 41, the surge tank 42 and the intake pipe 43 form an intake passage.

Further, the intake system 40 includes an air filter 44, a throttle valve 45 and a throttle valve actuator 45a in order in a direction from the other end of the intake pipe 43 toward a downstream side (toward the surge tank 42). The air filter 44, the throttle valve 45 and the throttle valve actuator 45a are provided in the intake pipe 43.

The throttle valve 45 is supported rotatably in the intake pipe 43 and is configured to be driven by the throttle valve actuator 45a to adjust an opening degree of the throttle valve 45. The throttle valve actuator 45a is comprised of a DC motor and is configured to drive the throttle valve 45 in response to a command supplied by the ECU 80.

The exhaust system 50 includes an exhaust manifold 51 and an exhaust pipe 52. The exhaust manifold 51 is connected in communication with the exhaust ports 33. The exhaust pipe 52 is connected in communication with the exhaust manifold 51. The exhaust ports 33, the exhaust manifold 51 and the exhaust pipe 52 form an exhaust passage.

Further, the exhaust system 50 includes a three-way catalyst 53 provided in the exhaust pipe 52. The three-way catalyst 53 is a so-called three-way catalyst device (i.e., an exhaust gas purification catalyst) which carries active components comprised of noble metal such as platinum. The three-way catalyst 53 has an oxidation function for oxidizing unburned components such as HC, CO and $H_2$ and a reduction function for reducing NOx (i.e., nitrogen oxide) when an air-fuel ratio of a gas flowing into the three-way catalyst 53 corresponds to the stoichiometric air-fuel ratio.

Further, the three-way catalyst 53 has an oxygen absorption function for absorbing or storing oxygen. With this oxygen absorption function, even when the air-fuel ratio changes from the stoichiometric air-fuel ratio, the three-way catalyst 53 can purify the unburned components and the NOx. This oxygen absorption function is derived from ceria (i.e., $CeO_2$) carried in the three-way catalyst 53.

As shown in FIG. 2, the fuel supply system 60 includes a low pressure fuel pump 61, a high pressure fuel pump 62, a fuel discharge pipe 63, a delivery pipe (i.e., a pressure accumulation chamber) 64 and a fuel tank 65. The fuel discharge pipe 63 connects the low pressure fuel pump 61 to the delivery pipe 64 in communication manner. The delivery pipe 64 is connected to the fuel injectors 39 in communication manner.

The low pressure fuel pump 61 is provided in the fuel tank 65. The low pressure fuel pump 61 is driven by an electric motor actuated in response to a command supplied by the ECU 80 described later to discharge fuel stored in the fuel tank 65 to the fuel discharge pipe 63.

The high pressure fuel pump 62 is interposed in the fuel discharge pipe 63. Fuel reaches the high pressure fuel pump 62 from the low pressure fuel pump 61 via the fuel discharge pipe 63. The high pressure fuel pump 62 pressurizes the fuel and supplies the delivery pipe 64 with this pressurized fuel having a high pressure via the fuel discharge pipe 63. The high pressure fuel pump 62 is actuated by a drive shaft coordinating with the crank shaft 24 of the engine 10.

The high pressure fuel pump 62 includes an electromagnetic valve not shown in a fuel suction part of the high pressure fuel pump 62. The electromagnetic valve is opened on the basis of a command supplied by the ECU 80 at the beginning of a fuel suction operation carried out by the high pressure fuel pump 62 and is closed at a predetermined timing during a fuel pressurizing operation carried out by the high pressure fuel pump 62. As the timing of the closing of the electromagnetic valve advances, an effective stroke of a plunger not shown of the high pressure fuel pump 62 increases and thus, an amount of fuel discharged from the high pressure fuel pump 62 increases. As a result, a pressure of fuel supplied to the fuel injectors 39 increases. In other words, the high pressure fuel pump 62 is configured to adjust a pressure of fuel in the delivery pipe 64 (i.e., a fuel injection pressure or a delivery pipe pressure or a fuel pressure) in response to a command supplied by the ECU 80.

Further, a relief valve 66 is interposed in the fuel discharge pipe 63 in the fuel tank 65. When a pressure of fuel in the fuel discharge pipe 63 reaches a predetermined pressure, the relief valve 66 is opened by the pressure of fuel. When the relief valve 66 opens, a part of fuel discharged from the low pressure fuel pump 61 to the fuel discharge pipe 63 is returned to the fuel tank 65 via the relief valve 66 and a relief pipe 67 connected in communication with the relief valve 66.

The ECU 80 is comprised of an electronic circuit including a known microcomputer and includes a CPU, a ROM, a RAM, a back-up RAM, an interface and the like. The ECU 80 is connected to various sensors described later and is configured to receive signals from these sensors. Further, the ECU 80 is configured to supply various actuators (e.g., the throttle valve actuator 45a, the ignition devices 35 and the fuel injectors 39) with respective command signals (or respective drive signals).

As shown in FIGS. 1 and 2, the ECU 80 is connected to an air flow meter 71, a throttle position sensor 72, a water temperature sensor 73, a crank angle sensor 74, a fuel pressure sensor 75, an acceleration pedal operation amount sensor 76, a brake pedal sensor 77, a vehicle speed sensor 78 and an ignition switch 79.

The air flow meter 71 is provided in the intake pipe 43. The air flow meter 71 is configured to measure a mass flow rate of air (i.e., an intake air amount) passing through the air flow meter 71 and output a signal expressing the intake air amount Ga. Further, the air flow meter 71 incorporates an atmospheric pressure sensor therein. The atmospheric pressure sensor is configured to measure an atmospheric pressure and output a signal expressing the atmospheric pressure Pa.

The throttle position sensor 72 is provided adjacent to the throttle valve 45 in the intake pipe 43. The throttle position sensor 72 is configured to detect an opening degree of the throttle valve 45 (i.e., a throttle valve opening degree) and output a signal expressing the throttle valve opening degree TA.

The water temperature sensor 73 is provided in the cylinder block part 20. The water temperature sensor 73 is configured to measure a temperature of cooling water for cooling the engine 10 (i.e., a cooling water temperature) and output a signal expressing the cooling water temperature THW.

The crank angle sensor 74 is provided in the cylinder block part 20. The crank angle sensor 74 is configured to output a signal depending on a rotation position of the crank shaft 24 (i.e., a crank angle). The ECU 80 acquires a crank angle of the engine 10 with respect to the compression top dead center of a predetermined cylinder (i.e., an absolute crank angle) on the basis of signals output from the crank angle sensor 74 and a cam position sensor not shown. Further, the ECU 80 acquires an engine speed NE on the basis of a signal output from the crank angle sensor 74.

The fuel pressure sensor 75 is provided in the delivery pipe 64 (see FIG. 2). The fuel pressure sensor 75 is configured to measure a pressure of fuel supplied to the fuel injectors 39 (i.e., a delivery pipe pressure or a fuel pressure) and output a signal expressing the fuel pressure PF.

The present control device controls a command signal to be supplied to the high pressure fuel pump 62 such that a difference between the fuel pressure PF acquired on the basis of the output signal output from the fuel pressure sensor 75 and a target fuel pressure PFtgt becomes zero. For example, when the acquired fuel pressure PF is lower than the target fuel pressure PFtgt, the present control device controls a command signal to be supplied to the high pressure fuel pump 62 such that an amount of fuel discharged from the high pressure fuel pump 62 increases. Thereby, the pressure of the fuel supplied to the fuel injectors 39 (i.e., the fuel pressure PF) increases.

The acceleration pedal operation amount sensor 76 is configured to detect an operation amount of an acceleration pedal 91 and output a signal expressing the operation amount Accp (see FIG. 1). It should be noted that the ECU 80 drives the throttle valve actuator 45a such that the throttle valve opening degree TA increases as the acceleration pedal operation amount Accp increases except for a particular case described later.

The brake pedal sensor 77 is configured to detect an operation amount of a brake pedal 92 and output a signal expressing the operation amount Brkp of the brake pedal 92. It should be noted that the brake pedal sensor 77 may be replaced with a switch which outputs a high signal when the brake pedal 92 is operated (i.e., when a brake operation state is an on-state) and an off signal when the brake pedal 92 is not operated (i.e., when the brake operation is in an off-state).

The vehicle speed sensor 78 is configured to measure a speed of a vehicle (i.e., a vehicle speed) on which the engine 10 is mounted and output a signal expressing the vehicle speed SPD.

The ignition switch 79 is a switch which operates the engine 10 and stops the operation of the engine 10 and is configured to output a signal expressing an on/off state of the ignition switch 79.

<Summary of Engine Stop Control by Control Device>

Next, a summary of an engine stop control executed by the present control device will be described. The present control device decreases the engine speed NE to zero to stop the operation of the engine 10 (i.e., an engine operation) when a condition for causing the engine speed NE to be zero, that is, a condition for stopping the engine operation (i.e., an engine stop condition or an engine operation stop condition) is satisfied. In other words, the present control device executes an engine stop control for causing the fuel injectors 39 to stop fuel injections (hereinafter, will be simply referred to as "the fuel injection") and causing the ignitions devices 35 to stop ignitions of fuel (hereinafter, will be simply referred to as "the fuel ignition").

In this embodiment, the engine stop condition is satisfied when the brake pedal 92 is depressed or operated and the vehicle speed SPD becomes equal to or lower than a predetermined speed SPDth.

Next, the engine stop control executed by the present control device will be described concretely with reference to FIG. 3.

Figure 3:
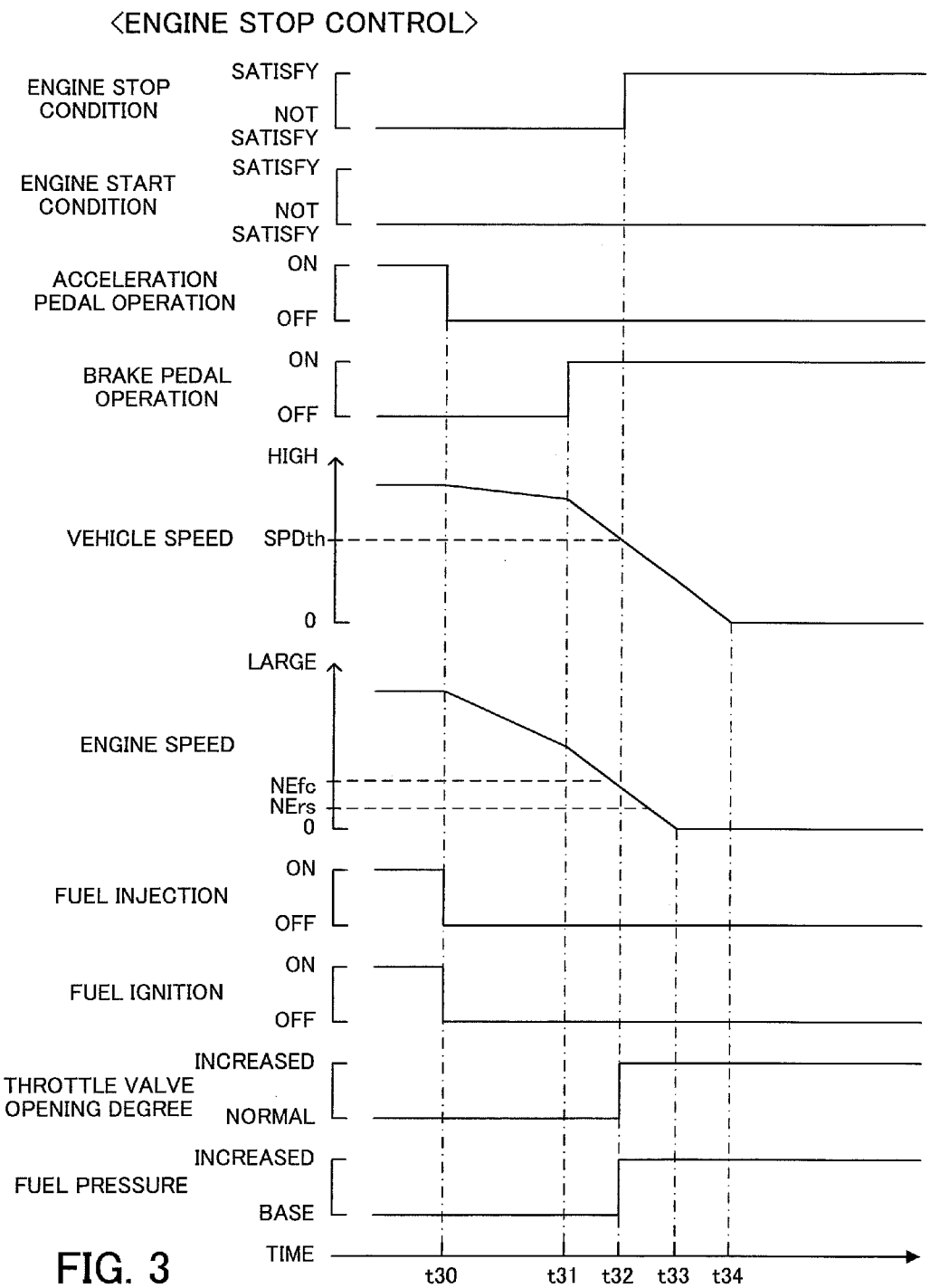
FIG. 3 shows a time chart used for describing an engine stop control by the control device according to the embodiment.

In an example shown in FIG. 3, until a time t30, the acceleration pedal 91 is depressed, that is, the operation state of the acceleration pedal 91 corresponds to an on-state and the acceleration pedal operation amount Accp is larger than zero and thus, the engine stop condition is not satisfied. Therefore, until the time t30, the present control device sends command signals to the fuel injectors 39 and the ignition devices 35 to carry out the fuel injections and the fuel ignitions.

Further, in this example, at the time 30, the acceleration pedal 91 is released, that is, the operation state of the acceleration pedal 91 becomes an off-state and thus, the acceleration pedal operation amount Accp becomes zero. At this time, the engine speed NE is equal to or larger than a fuel-cut engine speed NEfc described later and thus, a fuel-cut condition is satisfied.

When the fuel-cut condition is satisfied, the present control device starts a fuel-cut control described later. In other words, the present control device stops the fuel injections and the fuel ignitions. In this manner, the fuel-cut control is also a control for causing the fuel injectors 39 to stop the fuel injections and causing the ignition devices 35 to stop the fuel ignitions similar to the engine stop control. However, while the engine stop control is continued until the engine speed NE becomes zero as far as the acceleration pedal 91 is not depressed, the execution of the fuel-cut control is stopped when the engine speed NE becomes equal to or smaller than an engine operation restart engine speed NErs described later even in case that the acceleration pedal 91 is not depressed. In this point of view, the fuel-cut control is different from the engine stop control.

It should be noted that in this example, at the time t30, the brake pedal 92 is released, that is, the operation state of the brake pedal 92 corresponds to the off-state, the brake operation amount Brkp is zero and the vehicle speed SPD is larger than the predetermined vehicle speed SPDth and thus, the engine stop condition is not satisfied.

Then, in this example, at a time t31, the brake pedal 92 is depressed, i.e., the operation state of the brake pedal 92 becomes the on-state and the brake operation amount Brkp becomes larger than zero.

Then, the vehicle speed SPD gradually decreases and at a time t32, the vehicle speed SPD reaches the predetermined vehicle speed SPDth. At this time, the brake pedal 92 is depressed and the vehicle speed SPD becomes equal to or smaller than the predetermined vehicle speed SPDth. Thus, the engine stop condition is satisfied. Therefore, the present control device starts the engine stop control. In particular, the present control device stops the fuel injections and the fuel ignitions. In this regard, at this time, the fuel injections and the fuel ignitions have been already stopped by the fuel-cut control and thus, the present control device continues to stop the fuel injections and the fuel ignitions. It should be noted that at this time, a clutch (not shown) of the vehicle on which the engine 10 is mounted, is released and thus, a transmission of a driving force from the engine 10 to drive wheels is stopped.

Further, when the engine stop condition is satisfied, the present control device increases the throttle valve opening degree TA to cause the throttle valve opening degree TA to exceed the present throttle valve opening degree (i.e., a predetermined learned throttle valve opening degree for maintaining the engine speed NE at zero or at an idling engine speed, that is, an idling engine operation learned opening degree) and increases the fuel pressure PF to cause the fuel pressure PF to exceed the present fuel pressure (i.e., a base fuel pressure PFb).

This increasing of the throttle valve opening degree TA and the fuel pressure PF is carried out in order to assuredly start the operation of the engine 10 by an ignition engine start control described later when a restart of the engine operation is requested (a request for restarting the engine operation is generated) before the engine speed NE becomes zero by the engine stop control (i.e., before the engine operation stops).

In this example, the engine stop control executed by the present control device causes the engine speed NE and the vehicle speed SPD to gradually decrease and then, at a time t33, the engine speed NE becomes zero and thus, the engine operation stops. Then, at a time t34, the vehicle speed SPD becomes zero.

The summary of the engine stop control executed by the present control device has been described.

<Concrete Engine Stop Control by Control Device>

Next, a concrete engine stop control executed by the present control device will be described. The CPU of the ECU 80 is configured (or programmed) to execute an engine stop control routine shown by a flowchart in FIG. 4 every an elapse of a predetermined time period when an engine stop condition described later is satisfied, that is, a value of an engine stop request flag Xstp described later is "1" and a value of an engine start request flag Xrst is "0". It should be noted that the CPU executes normal fuel injections and normal fuel injections when the state of the ignition switch 79 corresponds to the on-state, the engine stop condition and the fuel-cut condition described later are not satisfied and a value of an engine start completion flag Xss described later is "1", i.e., the engine start is completed.

Therefore, when the engine stop condition is satisfied and a predetermined timing comes, the CPU starts a process from a step 400 of FIG. 4 and then, sequentially executes processes of steps 410 to 430 described below. Then, the CPU proceeds with the process to a step 495 to terminate this routine once.

Step 410: The CPU stops the fuel injections. In this case, the CPU sends no command signal to the fuel injectors 39.

Step 415: The CPU stops the fuel ignitions. In this case, the CPU sends no command signal to the ignition devices 35.

Step 420: The CPU sets a target throttle valve opening degree TAtgt to a value obtained by adding a predetermined value dTA to a first opening degree TA1 (TAtgt=TA1+dTA). In this example, the first opening degree TA1 corresponds to a throttle valve opening degree set as the target throttle valve opening degree TAtgt in the fuel-cut control shown in FIG. 11 described later, that is, the first opening degree TA1 corresponds to zero or the aforementioned idling engine operation learned opening degree (for example, see JP 2013-142334 A). Further, the predetermined value dTA is set as a positive value larger than zero and in this example, a positive value for causing a value obtained by adding this predetermined value dTA to the first opening degree TA1 to correspond to a throttle valve opening degree TAmax corresponding to an opening degree of the fully-opened throttle valve 45.

Before the process of the step 420 is first executed, at least the fuel-cut control has been executed and during the execution of the fuel-cut control, the target throttle valve opening degree TAtgt is set as zero or the idling engine operation learned opening degree as described later. Therefore, at the step 420, the target throttle valve opening degree TAtgt is set to a value larger than the target throttle valve opening degree TAtgt which is set until the engine stop condition is satisfied.

Step 425: The CPU sets a target fuel pressure PFtgt to a value obtained by adding a predetermined value dPF to a base fuel pressure PFb (PFtgt=PFb+dPF). In this example, the base fuel pressure PFb and the predetermined value dPF are both positive values larger than zero. In particular, the base fuel pressure PFb corresponds to a fuel pressure set as the target fuel pressure PFtgt when a control other than the engine stop control is executed.

Therefore, before the process of the step 425 is first executed, the target fuel pressure PFtgt is set to the base fuel pressure PFb. Thus, at the step 425, the target fuel pressure PFtgt is set to a value larger than the target fuel pressure PFtgt set until the engine stop condition is satisfied.

Step 430: The CPU sends command signals to the throttle valve actuator 45a and the high pressure fuel pump 62 in accordance with the target throttle valve opening degree TAtgt set at the step 420 and the target fuel pressure PFtgt set at the step 425, respectively.

Thereby, the throttle valve opening degree TA and the fuel pressure PF are controlled to the target throttle valve opening degree TAtgt and the target fuel pressure PFtgt, respectively. In particular, the throttle valve opening degree TA and the fuel pressure PF are increased from the throttle valve opening degree and the fuel pressure, respectively, accomplished until the engine stop condition is satisfied. Further, the fuel injection and the fuel ignition are not carried out and thus, the engine speed NE gradually decreases to zero, that is, the engine operation stops as far as the engine stop condition is satisfied.

The concrete engine stop control executed by the present control device has been described.

<Summary of Fuel Pressure Decrease Control by Control Device>

Next, a summary of a fuel pressure decrease control executed by the present control device will be described.

As described above, when the engine stop condition is satisfied, the present control device starts the engine stop control. The present control device increases the fuel pressure PF in order to assuredly start the operation of the engine 10 by the ignition engine start control when the restart of the engine operation is requested before the engine speed NE is caused to become zero, that is, before the engine operation stops by the engine stop control (see the time t32 of FIG. 3 and the step 425 of FIG. 4).

In this regard, if the restart of the engine operation is not requested after the engine stop control starts, the engine operation stops and then, the state of the ignition switch 79 may be changed to the off-state. In this case, the engine operation may have been continued to be stopped for a long time. Under the circumstances, if the fuel pressure PF is maintained at an increased fuel pressure, fuel may leak from the respective fuel injectors 39 into the respective combustion chambers 25 during the stop of the engine operation.

When the fuel leaks into the combustion chambers 25, the leaked fuel is discharged at once to the exhaust passage at a next start of the operation of the engine 10. In this case, since the engine operation has stopped for a long time, the temperature of the three-way catalyst 53 is low and thus, there is a high possibility that the three-way catalyst 53 is not activated. Thus, the fuel discharged to the exhaust passage may flow out from the three-way catalyst 53 without being purified by the three-way catalyst 53. Thereby, the exhaust emission property decreases.

Accordingly, the present control device is configured to execute a fuel pressure decrease control described below when the state of the ignition switch 79 is changed from the on-state to the off-state after the engine operation stops, that is, the engine speed NE becomes zero without the request of the restart of the engine operation after the start of the engine stop control. In other words, the present control device is configured to determine that a condition for executing the fuel pressure decrease control (i.e., a particular execution condition) is satisfied when the state of the ignition switch 79 is changed from the on-state to the off-state after the rotation of the engine 10 stops and then, execute the fuel pressure decrease control described below.

Figure 5:
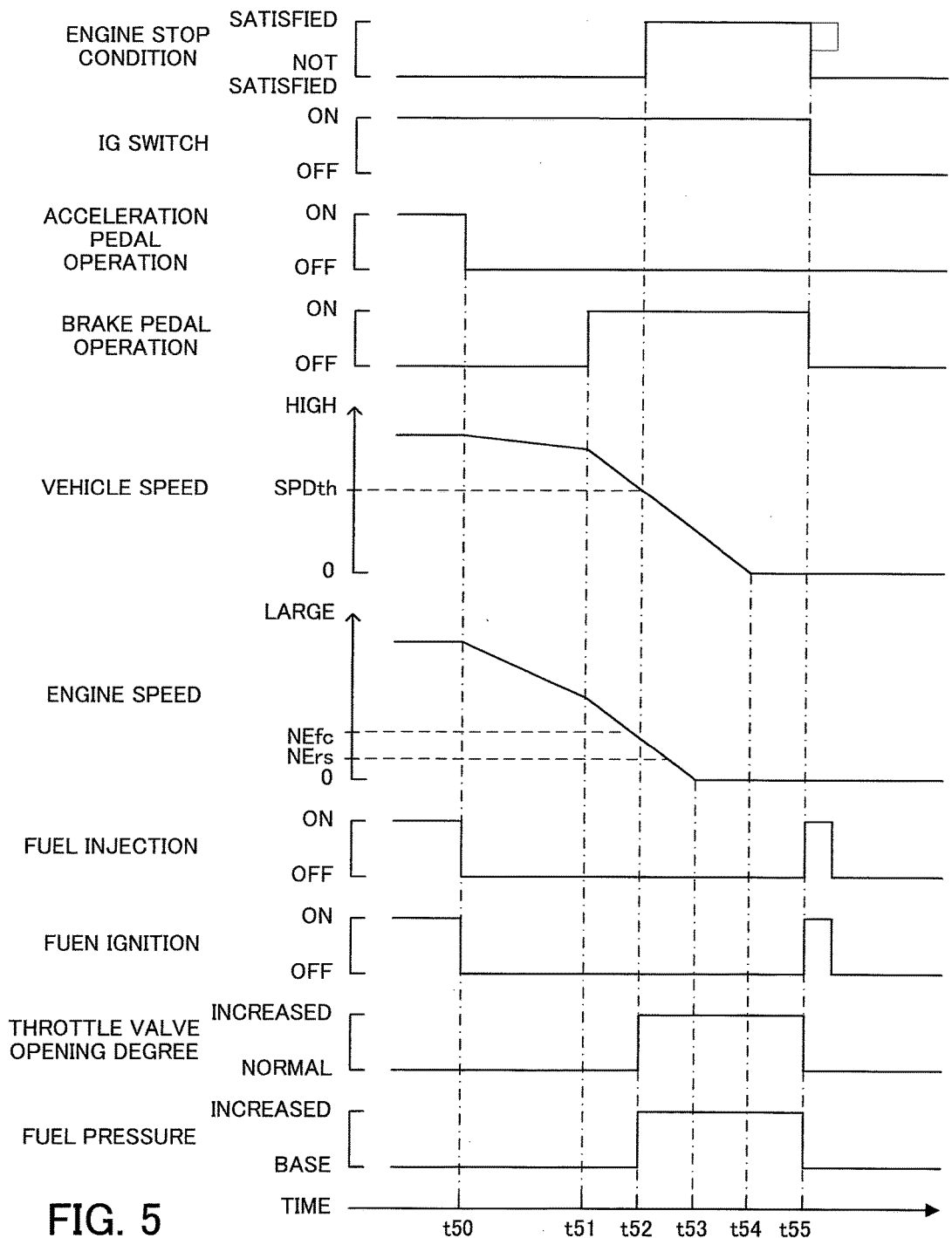
FIG. 5 shows a time chart used for describing a fuel pressure decrease control executed by the control device according to the embodiment.

This fuel pressure decrease control executed by the present control device will be described with reference to FIG. 5. Similar to the example shown in FIG. 3, also in an example shown in FIG. 5, at a time t53, the engine speed NE becomes zero, i.e., the engine operation is stooped and at a time t54, the vehicle speed SPD becomes zero.

Then, in this example, at a time t55, the state of the ignition switch 79 is changed from the on-state to the off-state. Thereby, the engine stop condition becomes unsatisfied. At this time, the present control device determines which cylinder is a particular cylinder in which the intake valves 32 are closed and the exhaust valves 34 are open. When the engine 10 has four cylinders, in many cases, the intake valves 32 are closed and the exhaust valves 34 are open in any one of the cylinders upon the stop of the operation of the engine 10.

After the present control device determines the particular cylinder, the present control device executes the fuel pressure decrease control for causing the fuel injector 39 of the particular cylinder to inject fuel and the ignition device 35 of the particular cylinder to ignite the fuel to burn the fuel and causing the fuel injector 39 of the particular cylinder to further inject fuel at the completion of the combustion of the fuel. At this time, the state of the ignition switch 79 corresponds to the off-state and thus, the operations of the low and high pressure fuel pumps 61 and 62 are stopped. Therefore, the present control device can decrease the fuel pressure PF by the fuel injection carried out by the fuel pressure decrease control.

In this fuel pressure decrease control, an amount QFi of fuel injected by a first fuel injection from the fuel injector 39 of the particular cylinder is set to an amount capable of being burned sufficiently by air (in particular, oxygen) in the particular cylinder. Hereinafter, the amount QFi will be referred to as "the first injection amount QFi" and the first fuel injection will be simply referred to as "the first injection".

On the other hand, an amount QFa of fuel injected from the fuel injector 39 of the particular cylinder by a second fuel injection is set to an amount capable of decreasing the fuel pressure PF to a fuel pressure PFp, at which no fuel leaks from the respective fuel injectors 39 into the respective combustion chambers 25 during a relatively long time stop of the engine operation. Hereinafter, the amount QFa will be referred to as "the additional injection amount QFa", the second fuel injection will be simply referred to as "the additional injection" and the fuel pressure PFp will be referred to as "the permissible fuel pressure PFp".

As described above, since the fuel pressure PF can be decreased to the permissible fuel pressure PFp by carrying out the first and additional injections, the fuel can be prevented from leaking from the respective fuel injectors 39 into the respective combustion chambers 25 even when the engine operation is continued to be stopped for a long time.

Figure 6A:
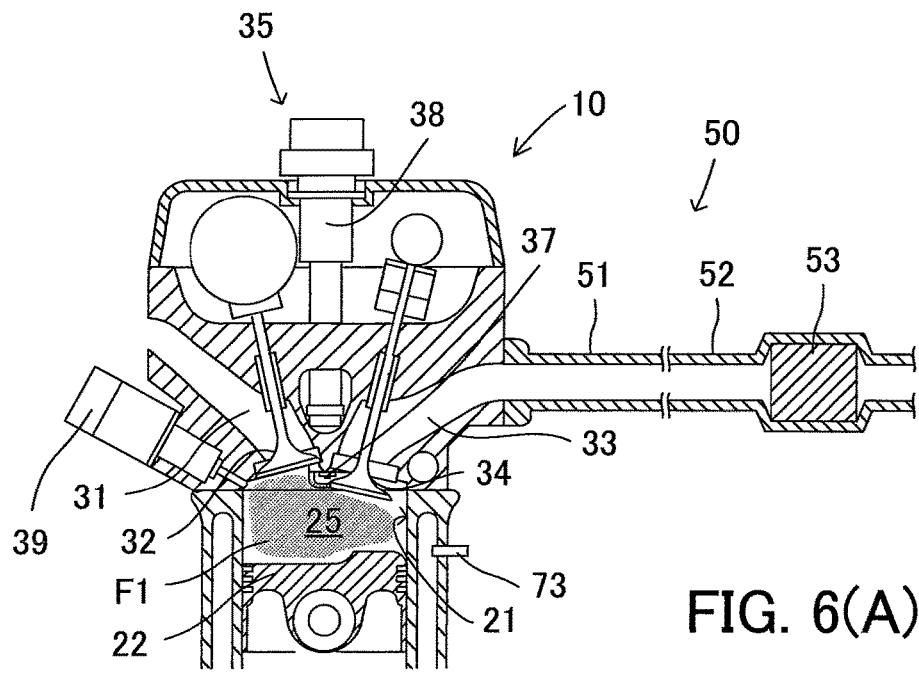
FIG. 6(A) shows the engine when a first fuel injection (an initial injection) is carried out by the fuel pressure decrease control executed by the control device according to the embodiment and FIG. 6(B) shows the engine when a fuel ignition is carried out by the fuel pressure decrease control executed by the control device according to the embodiment.
Figure 6B:
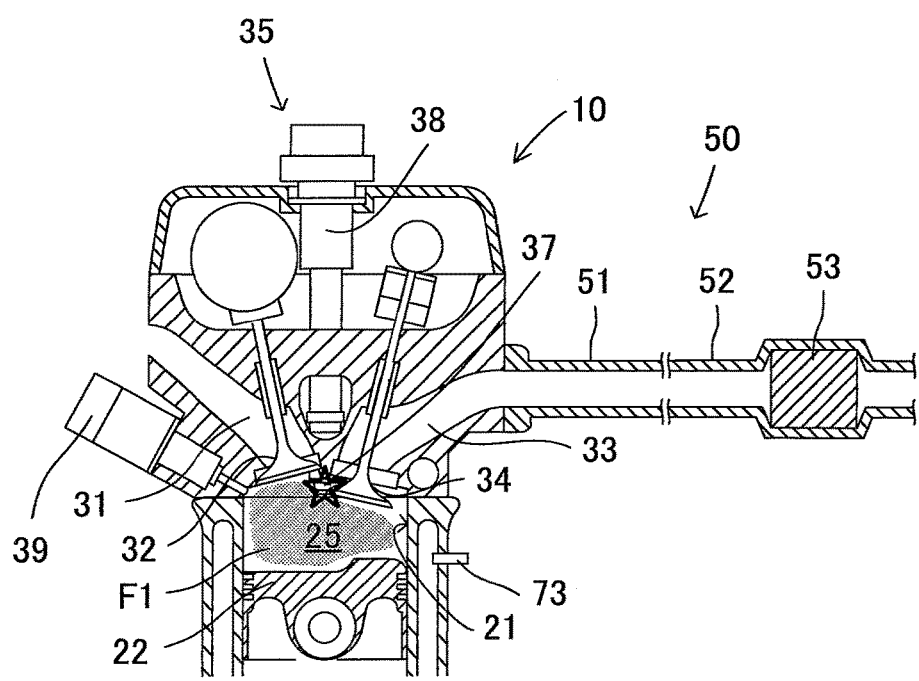
Figure 7A:
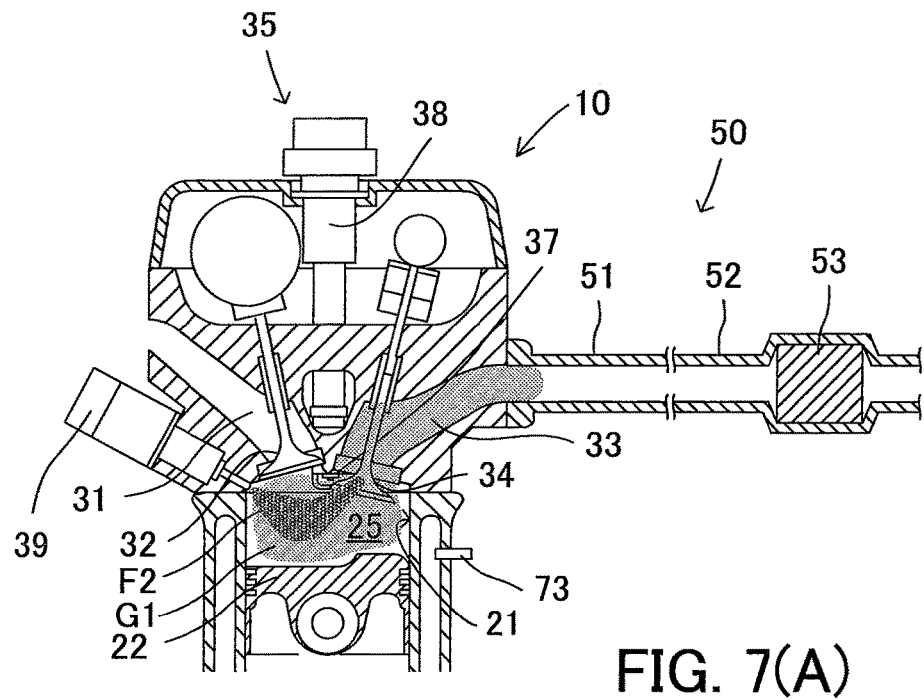
FIG. 7(A) shows the engine when a second fuel injection (an additional injection) is carried out by the fuel pressure decrease control executed by the control device according to the embodiment and FIG. 7(B) shows the engine after the second fuel injection is carried out by the fuel pressure decrease control executed by the control device according to the embodiment.

Further, as shown in FIG. 6(A), the fuel F1 injected by the first injection disperses in the combustion chamber 25 of the particular cylinder. Hereinafter, the fuel F1 will be referred to as "the first fuel". As shown in FIG. 6(B), this first fuel F1 is ignited by the ignition device 35 of the particular cylinder to burn. In this manner, a combustion gas is generated by the combustion of the first fuel F1 and then, expands. Since the intake valves 32 are closed and the exhaust valves 34 are open in the particular cylinder, the combustion gas G1 flows out from the combustion chamber 25 of the particular cylinder to the exhaust passage as shown in FIG. 7(A).

Figure 7B:
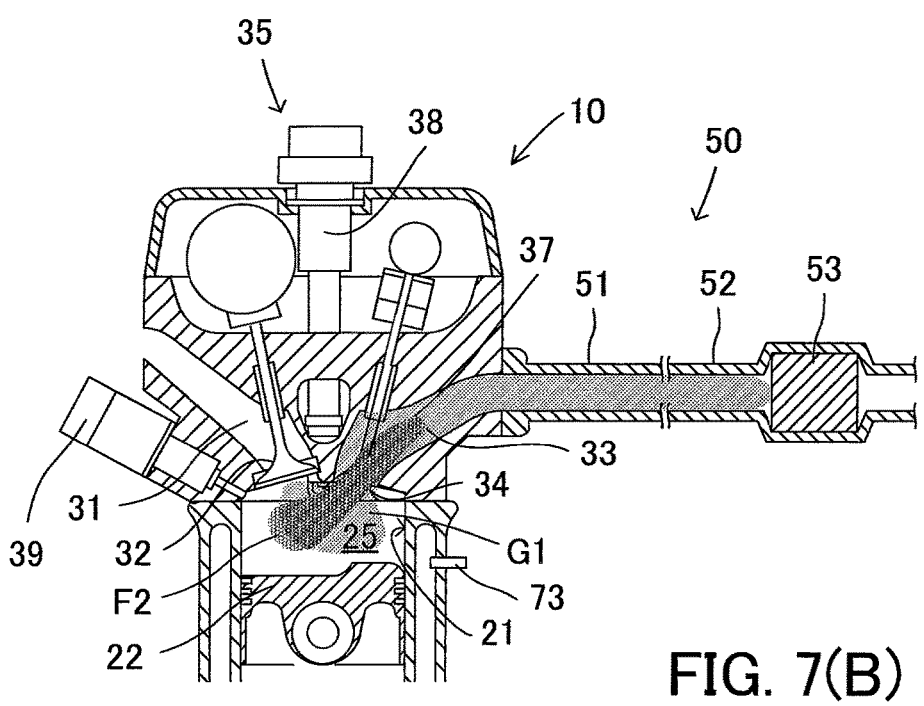

Further, the oxygen in the combustion chamber 25 of the particular cylinder has been consumed by the combustion of the first fuel F1. Therefore, the fuel F2 injected by the additional injection is unlikely to burn in the combustion chamber 25. Hereinafter, the fuel F2 will be referred to as "the additional fuel F2". In this regard, a flow of the combustion gas G1 from the combustion chamber 25 to the exhaust passage is produced by the combustion of the first fuel F1. Therefore, as shown in FIG. 7(A), the additional fuel F2 moves toward the exhaust ports 33 along with the flow of the combustion gas G1. Then, as shown in FIG. 7(B), the additional fuel F2 is discharged from the combustion chamber 25 to the exhaust passage along with the flow of the combustion gas G1.

In this manner, a timing of carrying out the additional injection according to this embodiment corresponds to a timing capable of maintaining the combustion of the first fuel F1 and causing the additional fuel F2 to move along with the flow of the combustion gas G1 toward the exhaust passage generated by the combustion of the first fuel F1.

The thus-discharged combustion gas G1 and the thus-discharged additional fuel F2 moving along with the combustion gas G1 flow into the three-way catalyst 53. Immediately after the state of the ignition switch 79 is changed from the on-state to the off-state, the temperature of the three-way catalyst 53 is relatively high and the three-way catalyst 53 is activated. Thus, the combustion gas G1 and the additional fuel F2 flowing into the three-way catalyst 53 are sufficiently purified by the three-way catalyst 53.

Therefore, even when the fuel (i.e., the first and additional fuels F1 and F2) is injected into the combustion chamber 25 of the particular cylinder by the fuel pressure decrease control, the exhaust emission property can be prevented from decreasing.

<Concrete Fuel Pressure Decrease Control by Control Device>

Next, a concrete fuel pressure decrease control executed by the present control device will be described. The CPU of the ECU 80 is configured or programmed to execute a fuel pressure decrease control routine shown by a flowchart in FIG. 8 every an elapse of a predetermine time period.

Figure 8:
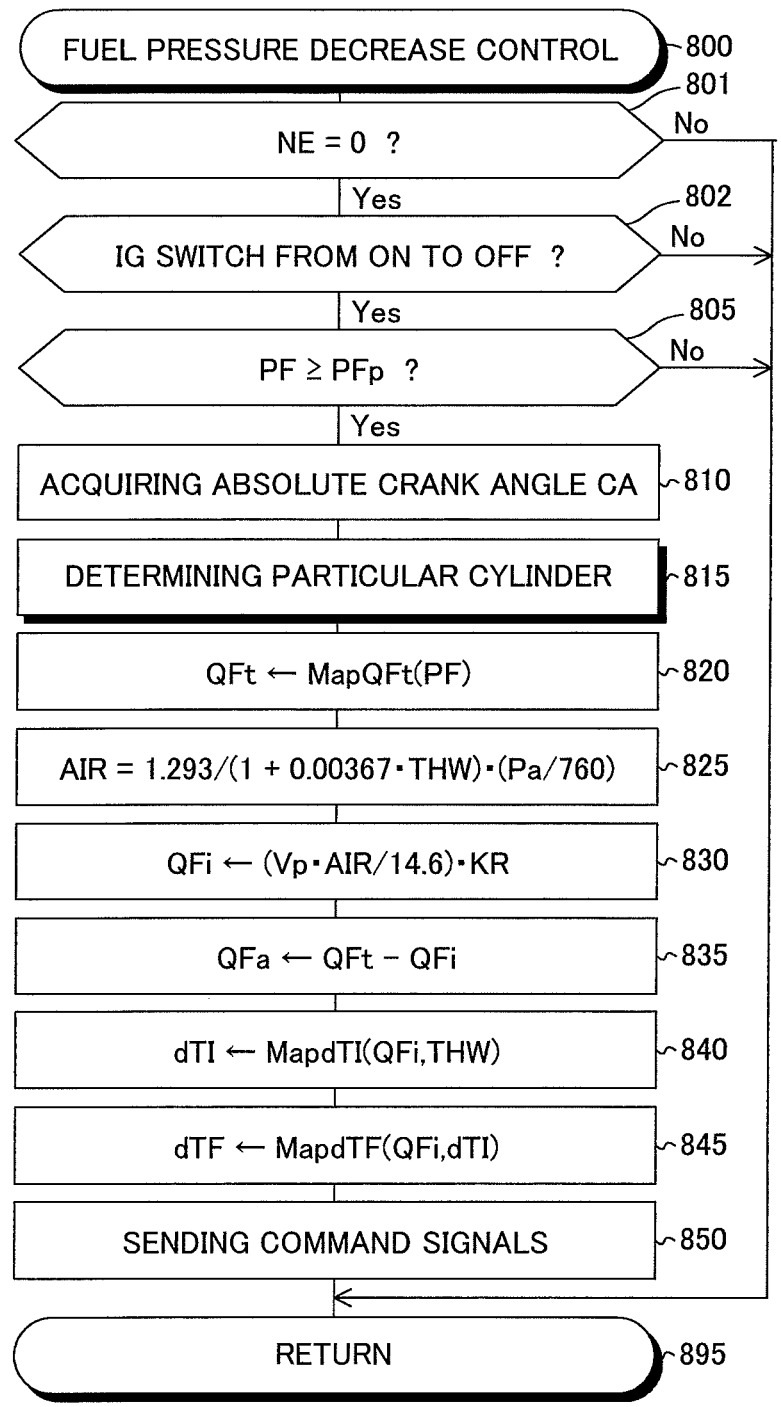
FIG. 8 shows a flow chart showing a fuel pressure decrease control routine executed by the CPU shown in FIG. 1.

Therefore, the CPU starts a process from a step 800 of FIG. 8 at a predetermined timing and then, proceeds with the process to a step 801 to determine whether or not the engine speed NE is zero.

When the engine speed NE is larger than zero upon the execution of the process of the step 801 by the CPU, the CPU determines "No" at the step 801 and then, proceeds with the process to a step 895 to terminate this routine once.

On the other hand, when the engine speed NE is zero upon the execution of the process of the step 801 by the CPU, the CPU determines "Yes" at the step 801 and then, proceeds with the process to a step 802 to determine whether or not the present time is immediately after the state of the ignition switch 79 is changed from the on-state to the off-state.

When the present time is not immediately after the state of the ignition switch 79 is changed from the on-state to the off-state, that is, when the state of the ignition switch 79 is continued to be the on-state or off-state upon the execution of the process of the step 802 by the CPU, the CPU determines "No" at the step 802 and then, proceeds with the process to the step 895 to terminate this routine once.

On the other hand, when the present time is immediately after the state of the ignition switch 79 is changed from the on-state to the off-state upon the execution of the process of the step 802 by the CPU, the CPU determines "Yes" and then, proceeds with the process to a step 805 to determine whether or not the fuel pressure PF is equal to or higher than the permissible fuel pressure PFp.

When the fuel pressure PF is lower than the permissible fuel pressure PFp upon the execution of the process of the step 805 by the CPU, the CPU determines "No" at the step 805 and then, proceeds with the process to the step 895 to terminate this routine once.

On the other hand, when the fuel pressure PF is equal to or higher than the permissible fuel pressure PFp upon the execution of the process of the step 805 by the CPU, the CPU determines "Yes" at the step 805 and then, sequentially executes processes of steps 810 to 850 described below. Then, the CPU proceeds with the process to the step 895 to terminate this routine once.

Step 810: The CPU acquires an absolute crank angle CA. As described above, the absolute crank angle CA is a crank angle of the engine 10 with respect to the compression top dead center of the predetermined cylinder.

Step 815: The CPU determines the particular cylinder on the basis of the absolute crank angle CA. As described above, the absolute crank angle CA is a crank angle of the engine 10 with respect to the compression top dead center of the predetermined cylinder on the basis of the signals output from the crank angle sensor 74 and the cam position sensor not shown. Therefore, since the crank angle of each of the cylinders can be acquired by using the absolute crank angle CA, the particular cylinder can be determined, that is, the cylinder in which the intake valves 32 are closed and the exhaust valves 34 are open can be determined.

Step 820: The CPU applies the fuel pressure PF to a lookup table MapQFt(PF) to acquire an amount QFt of the fuel to be injected from the fuel injector 39 necessary to decrease the fuel pressure PF to the permissible fuel pressure PFp. Hereinafter, the amount QFt will be referred to as "the total injection amount QFt". This table MapQFt(PF) is prepared on the basis of data acquired in advance by an experiment and stored in the ROM.

According to this table MapQFt(PF), the acquired total injection amount QFt increases as the fuel pressure PF increases. In detail, as the fuel pressure PF increases, a difference between the fuel pressure PF and the permissible fuel pressure PFp increases. Thus, in order to decrease the fuel pressure PF to the permissible fuel pressure PFp, it is necessary to inject much fuel from the fuel injector 39. For this reason, the acquired total injection amount QFt increases as the fuel pressure PF increases.

Step 825: The CPU acquires an in-cylinder air density AIR corresponding to a density of the air in the particular cylinder in accordance with following equation (1). In the equation (1), the value "1.293" is the weight volume ratio of the air, the value "0.00367" is the expansion rate of the air, the symbol "THW" is the cooling water temperature, the symbol "Pa" is the atmospheric pressure [mmHg] and the value "760" is the standard atmospheric pressure [mmHg].

$$AIR=1.293/(1+0.00367*THW)*(Pa/760) \qquad (1)$$

It should be noted that the CPU may assume that the in-cylinder air density AIR is constant.

Step 830: The CPU acquires a first injection amount QFi in accordance with following equation (2). In the equation (2), the symbol "Vp" is an in-cylinder volume of the particular cylinder defined by a position of the piston 22 of the particular cylinder. Further, the symbol "AIR" is the in-cylinder air density acquired at the step 825 and the value "14.6" is the stoichiometric air-fuel ratio. Further, the symbol "KR" is an increase coefficient which is a positive value equal to or larger than "1" and is set depending on the cooling water temperature THW. In particular, as the cooling water temperature THW decreases, the increase coefficient KR increases. In detail, as the cooling water temperature THW decreases, an amount of the fuel adhered to a wall face defining the combustion chamber 25 (i.e., an in-cylinder wall face) increases. Thus, in order to control the air-fuel ratio in the particular cylinder to a predetermined burnable air-fuel ratio, it is necessary to inject much fuel. For this reason, as the cooling water temperature THW decreases, the increase coefficient KR increases.

$$QFi=(Vp*AIR/14.6)*KR \qquad (2)$$

Step 835: The CPU subtracts the first injection amount QFi acquired at the step 830 from the total injection amount QFt acquired at the step 820 to acquire the additional injection amount QFa (QFa=QFt−QFi).

When the additional injection amount QFa acquired at this step 835 is larger than zero, the present control device can predict that the fuel pressure PF after the first injection is higher than the permissible fuel pressure PFp.

Step 840: The CPU applies the first injection amount QFi acquired at the step 830 and the cooling water temperature THW as a representative value of the temperature of the combustion chamber 25 (i.e., the in-cylinder temperature) to a lookup table MapdTI(QFi,THW) to acquire an ignition interval dTI. The ignition interval dTI is a period from a timing of terminating the first injection to a timing of starting the ignition of the first fuel by the ignition device 35. The table MapdTI(QFi,THW) is prepared on the basis of data acquired in advance by an experiment and stored in the ROM.

According to the table MapdTI(QFi,THW), as the first injection amount QFi increases, the acquired ignition interval dTI increases and as the cooling water temperature THW decreases, the acquired ignition interval dTI increases. In detail, as the amount of the fuel injected by the first injection increases, a time necessary for the fuel to sufficiently vaporize increases. For this reason, as the first injection amount QFi increases, the acquired ignition interval dTI increases. Similarly, as the cooling water temperature THW decreases, the temperature of the combustion chamber 25 decreases and thus, a time necessary for the fuel to sufficiently vaporize increases. For this reason, as the cooling water temperature THW decreases, the acquired ignition interval dTI increases.

Step 845: The CPU applies the first injection amount QFi acquired at the step 830 and the ignition interval dTI acquired at the step 840 to a lookup table MapdTF(QFi,dTI) to acquire an injection interval dTF. The injection interval dTF is a period from the timing of terminating the first injection to the timing of starting the additional injection and is acquired at least as a value larger than the ignition interval dTI. The table MapdTF(QFi,dTI) is prepared on the basis of data acquired in advance by an experiment and stored in the ROM.

According to this table MapdTF(QFi,dTI), as the first injection amount QFi increases, the acquired injection interval dTF increases and as the ignition interval dTI increases, the acquired injection interval dTF increases. In detail, as the first injection amount QFi increases, the period of the combustion of the first fuel increases and thus, the timing of the completion of the combustion of the first fuel is delayed. For this reason, as the first injection amount QFi increases, the acquired injection interval dTF increases. Further, as the ignition interval dTI increases, the timing of the start of the combustion of the first fuel is delayed and thus, the timing of the completion of the combustion of the first fuel is delayed. For this reason, as the ignition interval dTI increases, the acquired injection interval dTF increases.

Step 850: The CPU sends command signals to the fuel injector 39 of the particular cylinder and the ignition device 35 of the particular cylinder, respectively in accordance with the first injection amount QFi, the additional injection amount QFa, the ignition interval dTI and the injection interval dTF acquired at the steps 830 to 845, respectively.

Thereby, the fuel having the first injection amount QFi is injected from the fuel injector 39 of the particular cylinder. When the ignition interval dTI elapses from the timing of terminating the first injection, the first fuel is ignited by the ignition device 35. Then, when the injection interval dTF elapses from the timing of terminating the first injection (in this example, when the combustion of the first fuel is completed), the fuel having the additional injection amount QFa is injected from the fuel injector 39 of the particular cylinder. As a result, the fuel pressure PF decreases to the permissible fuel pressure PFp.

The concrete fuel pressure decrease control executed by the present control device has been described.

<Entire Engine Operation Control by Control Device>

Next, an entire operation control of the engine 10 executed by the present control device will be described. The CPU of the ECU 80 is configured or programmed to execute an engine operation control routine shown by a flowchart in FIG. 9 every an elapse of a predetermined time period. Therefore, at a predetermined timing, the CPU starts a process from a step 900 of FIG. 9 and then, proceeds with the process to a step 905 to determine whether or not the state of the ignition switch 79 corresponds to the on-state.

When the state of the ignition switch 79 corresponds to the off-state upon the execution of the process of the step 905 by the CPU, the CPU determines "No" at the step 905 and then, proceeds with the process to a step 995 to terminate this routine once.

On the other hand, when the state of the ignition switch 79 corresponds to the on-state upon the execution of the process of the step 905 by the CPU, the CPU determines "Yes" at the step 905 and then, proceeds with the process to a step 910 to determine whether or not a value of a fuel-cut flag XFC is "1".

In this example, the value of the fuel-cut flag XFC is set to "1" when a fuel-cut condition described below is satisfied. The fuel-cut condition is satisfied when all of following conditions (1) to (5) are satisfied.

(1) The acceleration pedal operation amount Accp is zero.
(2) The engine speed NE is equal to or larger than a predetermined engine speed (hereinafter, will be referred to as "the fuel-cut engine speed") NEfc.
(3) A value of an engine stop request flag Xstp is "0".
(4) A value of an engine start request flag Xrst is "0".
(5) A value of an engine start completion flag Xss is "1".

It should be noted that the details of the engine stop request flag Xstp, the engine start request flag Xrst and the engine start completion flag Xss will be described later.

The value of the fuel-cut flag XFC is set to "0" when a fuel supply restart condition described below (i.e., a condition for terminating the fuel-cut control and restarting the fuel injection) is satisfied.

The fuel supply restart condition is satisfied when any one of following conditions (1) to (5) is satisfied.

(1) The acceleration pedal operation amount Accp becomes larger than zero during the execution of the fuel-cut control (the value of the fuel-cut flag XFC=1).
(2) The engine speed NE becomes equal to or smaller than a predetermined engine speed (hereinafter, will be referred to as "the engine operation restart engine speed") NErs during the execution of the fuel-cut control.
(3) The value of the engine stop request flag Xstp is set to "1".
(4) The value of the engine start request flag Xrst is set to "1".
(5) The value of the engine start completion flag Xss is set to "0".

The engine restart engine speed NErs is set to a value smaller than the fuel-cut engine speed NEfc and larger than the idling engine speed NEid. Further, the engine restart engine speed NErs is a lower limit value of the engine speed capable of converging the engine speed NE on the idling engine speed NEid without decreasing the engine speed NE considerably to below the idling engine speed NEid by restarting the fuel injections and the fuel ignitions.

When the value of the fuel-cut flag XFC is "0" upon the execution of the process of the step 910 by the CPU, the CPU determines "No" at the step 910 and then, proceeds with the process to a step 920 to determine whether or not the value of the engine stop request flag Xstp is "1" and the value of the engine start request flag Xrst is "0".

The value of the engine stop request flag Xstp is set to "1" when the aforementioned engine stop condition is satisfied. The value of the engine start request flag Xrst is set to "1" when the brake pedal 92 is released and the acceleration pedal 91 is depressed after the engine stop control is started, that is, when a condition for restarting the engine operation (i.e., an engine start condition) is satisfied after the engine stop control is started.

Now, it is assumed that a determination condition is not satisfied at the step 920. In this case, the CPU determines "No" at the step 920 and then, proceeds with the process to a step 930 to determine whether or not the value of the engine stop request flag Xstp is "1" and the value of the engine start request flag Xrst is "1".

Now, it is assumed that the determination condition is not satisfied at the step 930. In this case, the CPU determines "No" at the step 930 and then, proceeds with the process to a step 940 to execute a normal control routine shown by a flowchart in FIG. 10.

Therefore, when the CPU proceeds with the process to the step 940, the CPU starts a process from a step 1000 of FIG. 10 to sequentially execute process of steps 1005 to 1030 described below. Then, the CPU proceeds with the process to the step 995 of FIG. 9 via a step 1095 to terminate this routine once.

Step 1005: The CPU applies the actual engine speed NE and the acceleration pedal operation amount Accp as a representative value of the actual engine load to a lookup table MapQFtgt(NE,Accp) to acquire a target injection amount QFtgt. According to this table MapQFtgt(NE,Accp), the acquired target injection amount QFtgt decreases as the engine speed NE increases and the acquired target injection amount QFtgt increases as the acceleration pedal operation amount Accp increases.

Step 1010: The CPU applies the engine speed NE and the acceleration pedal operation amount Accp to a lookup table MapTFtgt(NE,Accp) to acquire a target injection timing TFtgt. According to this table MapTFtgt(NE,Accp), the acquired target injection timing TFtgt advances as the engine speed NE increases and the acquired target injection timing TFtgt advances as the acceleration pedal operation amount Accp increases.

Step 1015: The CPU applies the engine speed NE and the acceleration pedal operation amount Accp to a lookup table MapTItgt(NE,Accp) to acquire a target ignition timing TItgt. According to this table MapTItgt(NE,Accp), the acquired target ignition timing TItgt advances as the engine speed NE increases and the acquired target ignition timing TItgt delays as the acceleration pedal operation amount Accp increases.

Step 1020: The CPU applies the engine speed NE and the acceleration pedal operation amount Accp to a lookup table MapTAtgt(NE,Accp) to acquire a target throttle valve opening degree TAtgt. According to this table MapTAtgt(NE,Accp), the acquired target throttle valve opening degree TAtgt increases as the engine speed NE increases and the acquired target throttle valve opening degree TAtgt increases as the acceleration pedal operation amount Accp increases.

Step 1025: The CPU sets the base fuel pressure PFb as a target fuel pressure PFtgt. The base fuel pressure PFb is a predetermined constant fuel pressure.

Step 1030: The CPU sends command signals to the fuel injectors 39, the ignition devices 35, the throttle valve actuator 45a and the high pressure fuel pump 62 in accordance with the target injection amount QFtgt, the target injection timing TFtgt, the target injection timing TItgt, the target throttle valve opening degree TAtgt and the target fuel pressure PFtgt set at the steps 1005 to 1025, respectively.

Thereby, while the throttle valve opening degree TA and the fuel pressure PF are controlled to the target throttle valve opening degree TAtgt and the target fuel pressure PFtgt, respectively, the fuel having the target injection amount QFtgt is injected from each of the fuel injectors 39 at the target injection timing TFtgt and then, the fuel is ignited by the respective ignition devices 35 at the target injection timing TItgt.

Again, referring to FIG. 9, when the value of the fuel-cut flag XFC is "1" upon the execution of the process of the step 910 by the CPU, the CPU determines "Yes" at the step 910 and then, proceeds with the process to a step 915 to execute a fuel-cut control routine shown by a flowchart in FIG.

Figure 11:
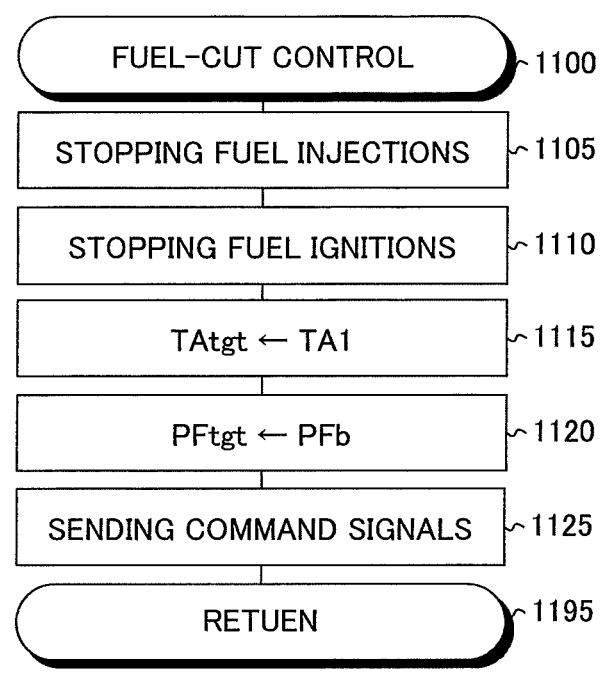
FIG. 11 shows a flow chart showing a fuel-cut control routine executed by the CPU shown in FIG. 1.

Therefore, when the CPU proceeds with the process to the step 915, the CPU starts a process from a step 1100 of FIG. 11 to sequentially execute processes of steps 1105 to 1125 described below. Then, the CPU proceeds with the process to the step 995 of FIG. 9 via a step 1195 to terminate this routine once.

Step 1105: The CPU stops the fuel injections. In this case, the CPU sends no command signal to the fuel injectors 39.

Step 1110: The CPU stops the fuel ignitions. In this case, the CPU sends no command signal to the ignition devices 35.

Step 1115: The CPU sets the first opening degree TA1 as the target throttle valve opening degree TAtgt.

Step 1120: The CPU sets the base fuel pressure PFb as the target fuel pressure PFtgt.

Step 1125: The CPU sends command signals to the throttle valve actuator 45a and the high pressure fuel pump 62 in accordance with the target throttle valve opening degree TAtgt and the target fuel pressure PFtgt set at the steps 1115 and 1120, respectively.

Thereby, the throttle valve opening degree TA is controlled to the first opening degree TA1 and the fuel pressure PF is controlled to the target fuel pressure PFtgt. As described above, in this case, the fuel injection and the fuel ignition are not carried out.

On the other hand, when the engine stop condition is satisfied and the value of the engine stop request flag Xstp is changed to "1", the CPU determines "No" at the step 910 of FIG. 9 and determines "Yes" at the step 920 and then, proceeds with the process to a step 925 to execute the engine stop control routine described with reference to FIG. 4. As a result, the throttle valve opening degree TA and the fuel pressure PF are both increased from the throttle valve opening degree and the fuel pressure set until the engine stop condition is satisfied, respectively. Further, since the fuel injection and the fuel ignition are not carried out, the engine speed NE decreases and as far as the engine start condition is not satisfied, the engine speed NE becomes zero over time and the engine operation stops.

When the brake pedal 92 is released and the acceleration pedal 91 is depressed and thus, the engine start condition is satisfied after the engine stop control is started, the value of the engine start request flag Xrst is changed to "1". In this case, the CPU determines "No" at the steps 910 and 920, respectively and determines "Yes" at the step 930 and proceeds with the process to a step 935 to execute a start control routine shown in FIG. 15 described later.

<Summary of Engine Start Control by Control Device>

Various activations realized by the engine start control routine will be described with reference to FIGS. 12 to 14.

The present control device starts the operation of the engine 10 by executing any one of following controls (1) to (3) in accordance with the engine speed NE.

Figure 10:
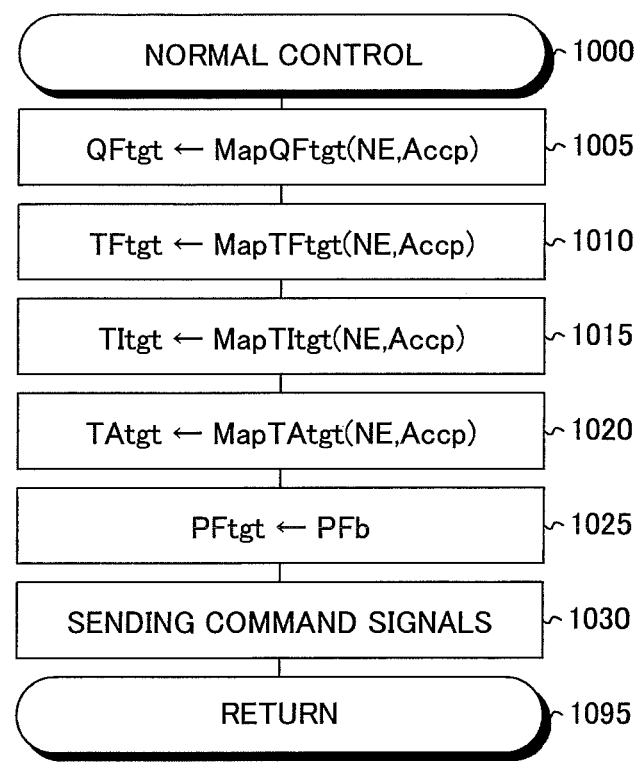
FIG. 10 shows a flow chart showing a normal control routine executed by the CPU shown in FIG. 1.

(1) The normal control shown in FIG. 10 (i.e., a control for carrying out the fuel injection at a latter half of the compression stroke and the fuel ignition at around the compression top dead center).

(2) A control for carrying out the fuel injection at a first half of the combustion stroke and the fuel ignition immediately after the fuel injection (i.e., the ignition engine start control).

(3) A control for carrying out the fuel injection at the latter half of the compression stroke and the fuel ignition immediately after the fuel injection while driving the starter motor 26 (i.e., a starter engine start control).

In particular, when the engine speed NE is equal to or larger than a first engine speed NE1 (NE≥NE1) upon the satisfaction of the engine start condition, the present control device starts the operation of the engine 10 by the normal control shown in FIG. 10.

On the other hand, when the engine speed NE is smaller than the first engine speed NE1 and equal to or larger than a second engine speed NE2 smaller than the first engine speed NE1 (NE2≤NE<NE1), the present control device starts the operation of the engine 10 by the ignition engine start control.

In this example, the ignition engine start control is a control for carrying out the fuel injection at the first half of the combustion stroke and the fuel ignition immediately after the fuel injection in a cylinder, the stroke of which is in the first half of the combustion stroke (for example, 10 to 30 degrees after the compression top dead center) or the stroke of which first moves into the combustion stroke after the satisfaction of the engine start condition.

On the other hand, when the engine speed NE is smaller than the second engine speed NE2 upon the satisfaction of the engine start condition (NE<NE2), after the engine speed NE becomes equal to or smaller than a third engine speed NE3 smaller than the second engine speed NE2, the present control device starts the operation of the engine 10 by the starter engine start control.

In this regard, the start of the operation of the engine 10 by the normal control shown in FIG. 10 will be concretely described with reference to FIG. 12. In an example shown in FIG. 12, the contents including the control until a time t122 when the engine stop condition is satisfied are the same as the contents including the control until the time t32 when the engine stop condition is satisfied as shown in FIG. 3. Therefore, in the example shown in FIG. 12, until a time t120, the acceleration pedal 91 is depressed and the brake pedal 92 is released. At the time t120, the acceleration pedal 91 is released. Then, at a time t121, the brake pedal 92 is depressed and then, at a time t122 when the vehicle speed SPD becomes smaller than the predetermined vehicle speed SPDth, the engine stop condition is satisfied.

Figure 12:
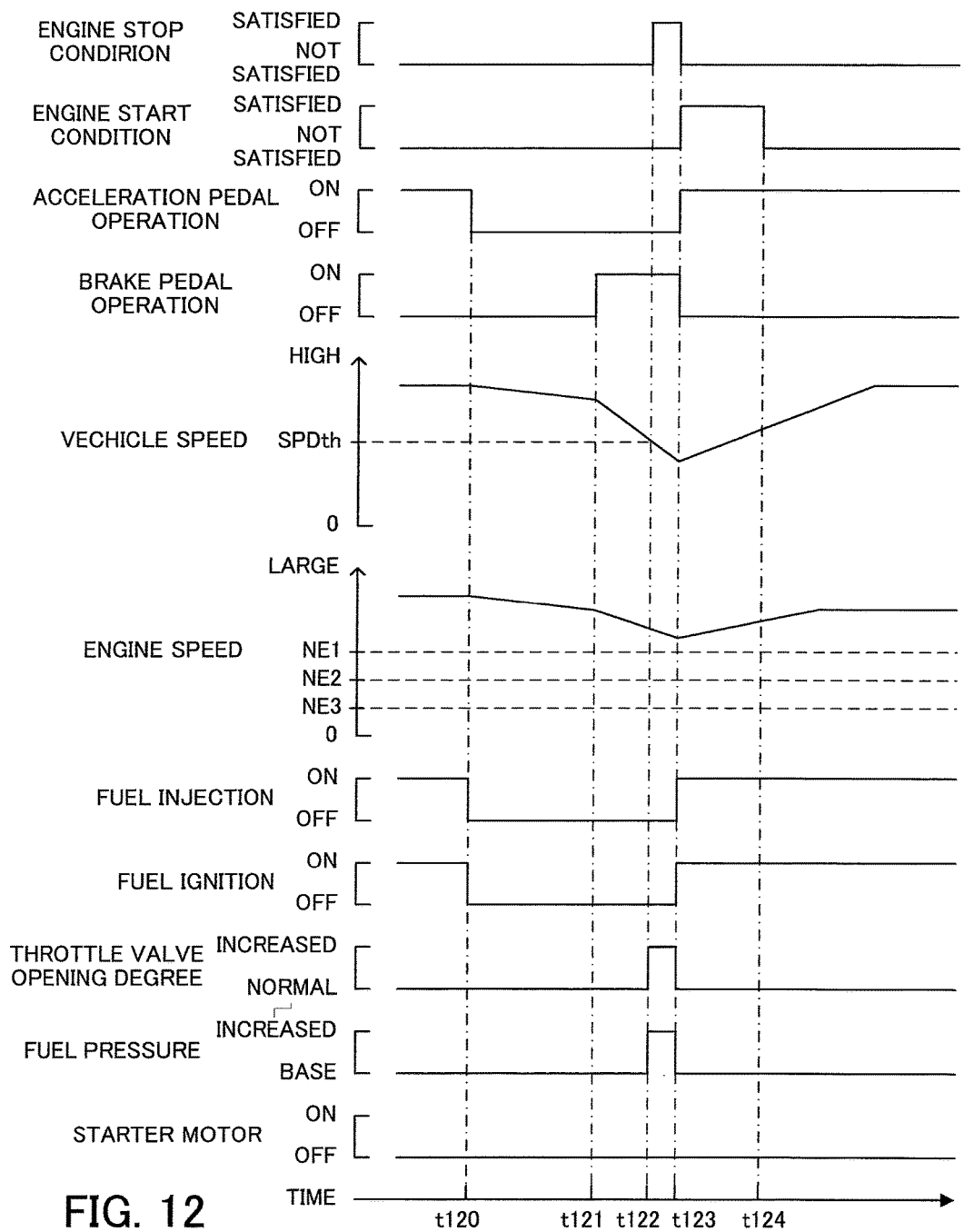
FIG. 12 shows a time chart used for describing an engine start control (a start of an operation of the engine carried out by a normal control) executed by the control device according to the embodiment.

In the example shown in FIG. 12, at a time t123, the brake pedal 92 is released and the acceleration pedal 91 is depressed. Thus, the engine start condition is satisfied. At this time, in this example, since the engine speed NE is equal to or larger than the first engine speed NE1, the present control device starts the normal control routine shown in FIG. 10.

In this example, the first engine speed NE1 is set to a lower limit value of the engine speed capable of applying a rotation torque to the crank shaft 24 to increase the engine speed NE by carrying out the fuel injection and the fuel ignition in accordance with the normal control routine shown in FIG. 10

In this example, since the engine speed NE is equal to or larger than the first engine speed NE1 upon the satisfaction of the engine start condition, the engine speed NE can be increased by carrying out the fuel injection and the fuel ignition in accordance with the normal control routine shown in FIG. 10. Therefore, after the time t123, the engine speed NE increases.

It should be noted that in this example, the first engine speed NE1 is set to an engine speed for determining the completion of the start of the operation of the engine 10 (for example, 600 rpm). Therefore, when the normal control shown in FIG. 10 is executed to start the operation of the engine 10, the start of the operation of the engine 10 has been already completed upon the start of the normal control.

The summary of the engine start by the normal control has been described.

Next, the start of the operation of the engine 10 by the ignition engine start control will be described with reference to FIG. 13. In an example shown in FIG. 13, the contents including the control until a time t133 upon the satisfaction of the engine start condition are the same as the contents including the control until the time t123 upon the satisfaction of the engine start condition in the example shown in FIG. 12.

Figure 13:
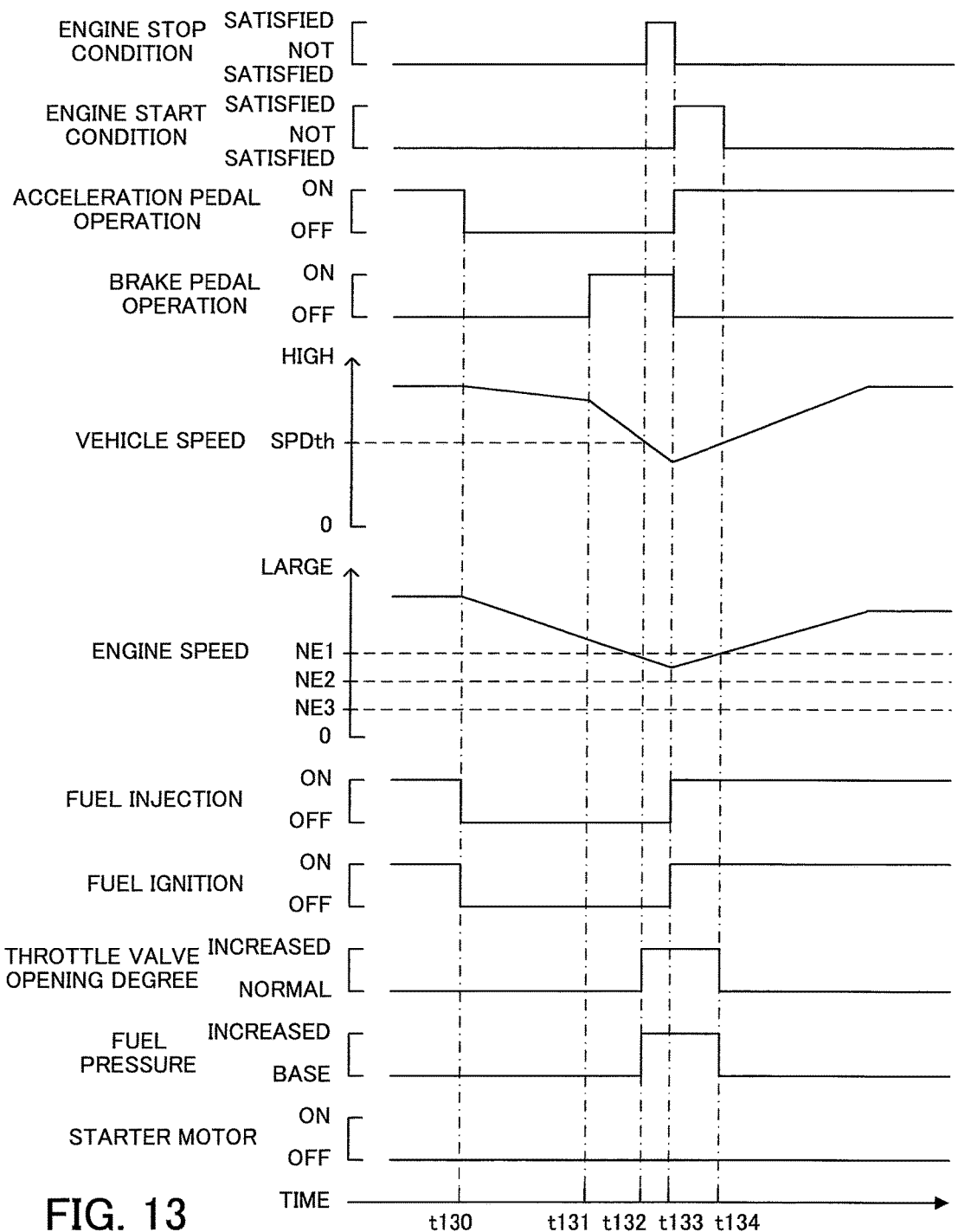
FIG. 13 shows a time chart used for describing an engine start control (a start of an operation of the engine carried out by an ignition engine start control) executed by the control device according to the embodiment.

In the example shown in FIG. 13, the engine speed NE upon the satisfaction of the engine start condition at a time t133 is smaller than the first engine speed NE1 and equal to or larger than the second engine speed NE2 (NE2≤NE<NE1). Therefore, the present control device starts the ignition engine start control, that is, the fuel injection at the first half of the combustion stroke and the fuel ignition immediately after the fuel injection.

In this example, the second engine speed NE2 is set to a lower limit value of a range of the engine speed NE capable of applying a sufficient rotation torque to the crank shaft 24 to increase the engine speed NE by carrying out the fuel injection at the first half of the combustion stroke and the fuel ignition immediately after the fuel injection by the ignition engine start control.

In this example, since the engine speed NE is equal to or larger than the second engine speed NE2 upon the satisfaction of the engine start condition, the engine speed NE can be increased by carrying out the fuel injection and the fuel ignition by the ignition engine start control. Therefore, after the time 133, the engine speed NE increases.

Further, in this example, after the satisfaction of the engine stop condition, the throttle valve opening degree TA has been increased and thus, an amount of the air in the combustion chamber 25 during the combustion stroke is relatively large. In addition, after the satisfaction of the engine stop condition, since the fuel pressure PF is also increased, a sufficient amount of the fuel for rotating the crank shaft 24 can be injected from the fuel injector 39. Therefore, the fuel can be assuredly burned by the ignition engine start control. As a result, the engine 10 can be assuredly started to be operated.

Therefore, after the time t133, the engine speed NE increases. Then, at a time t134, the engine speed NE reaches the first engine speed NE1 (i.e., an engine start completion engine speed) and the start of the operation of the engine 10 is completed.

The summary of the engine start by the ignition engine start control has been described.

Next, the start of the operation of the engine 10 by the starter engine start control will be described with reference to FIG. 14. In an example shown in FIG. 14, the contents including the control until a time t143 when the engine start condition is satisfied are the same as the contents including the control until the time 123 when the engine start condition is satisfied in the example shown in FIG. 12.

Figure 14:
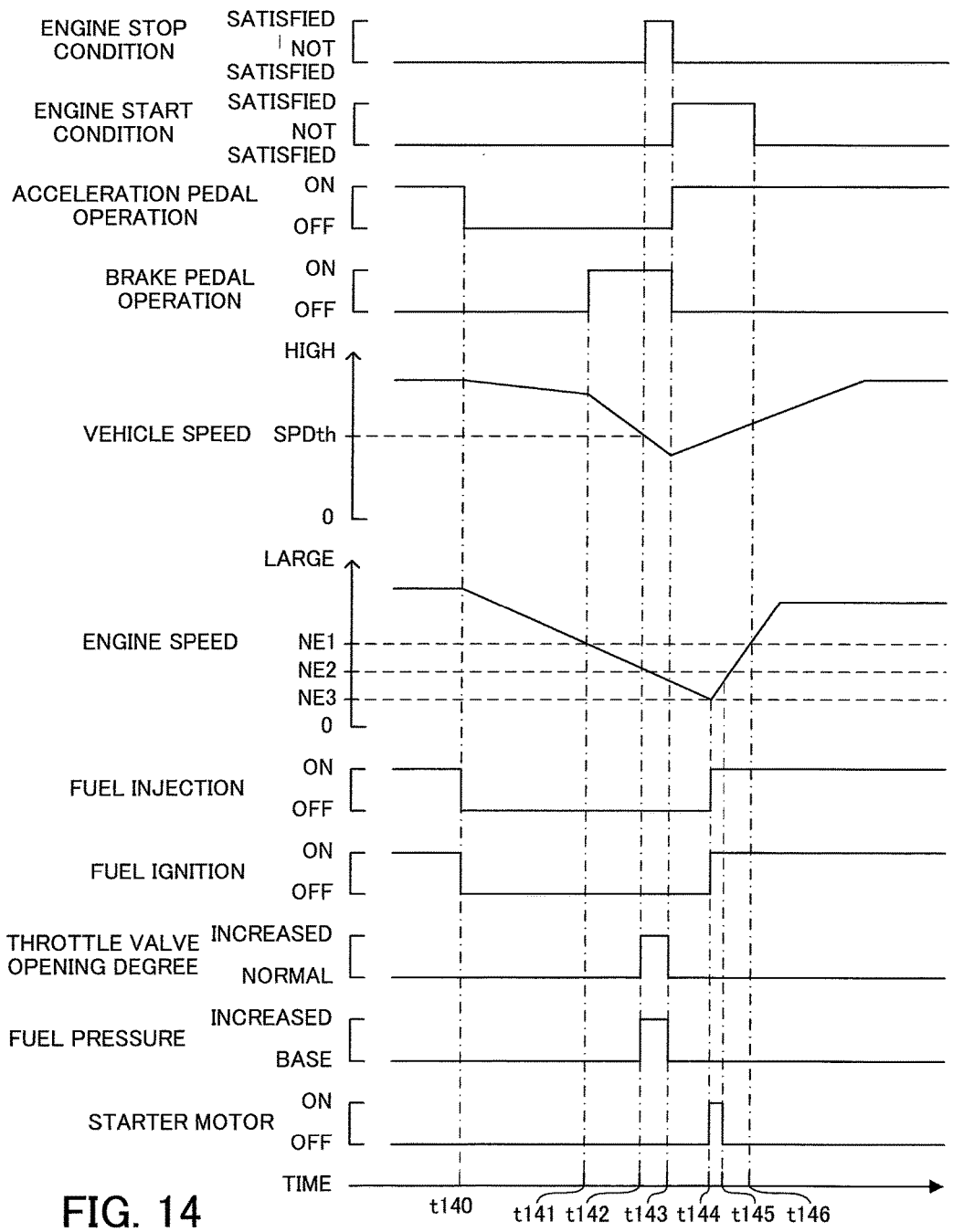
FIG. 14 shows a time chart used for describing an engine start control (a start of an operation of the engine by a starter engine start control) executed by the control device according to the embodiment.

In the example shown in FIG. 14, the engine speed NE upon the satisfaction of the engine start condition at the time t143 is smaller than the second engine speed NE2 and larger than the third engine speed NE3 (NE3<NE<NE2). In this case, the present control device does not start the starter engine start control at the time t143 and starts the starter engine start control at a time t144 when the engine speed NE decreases to the third engine speed NE3.

In other words, the present control device meshes the starter motor 26 with the ring gear 27 secured to the crank shaft 24 to apply a rotation torque to the crank shaft 24 via the ring gear 27 and carries out the fuel injection in the latter half of the compression stroke and the fuel ignition immediately after the fuel injection.

It should be noted that the starter motor 26 of this embodiment is a type of a starter motor in which the pinion gear 26a cannot mesh with the ring gear 27 secured to the crank shaft 24 when the engine speed NE is larger than the third engine speed NE3. Therefore, the third engine speed NE3 is set to an upper limit value of the engine speed NE, at which the pinion gear 26a of the starter motor 26 can mesh with the ring gear 27.

Therefore, when the engine speed NE is equal to or smaller than the third engine speed NE3, the engine speed NE can be increased by carrying out the fuel injection and the fuel ignition while meshing the pinion gear 26a of the starter motor 26 with the ring gear 27 to rotate the crank shaft 24.

Thus, after the time t144, the engine speed NE increases. Then, at a time t146, the engine speed NE reaches the first engine speed NE1 (i.e., the engine start completion engine speed) and thereby, the start of the operation of the engine 10 is completed.

It should be noted that the operation of the starter motor 26 is stopped at a time t145 when the engine speed NE increases to a constant engine speed.

The summary of the engine start by the starter engine start control has been described.

<Concrete Engine Start Control by Control Device>

Next, the engine start control executed by the present control device will be concretely described. As described above, when the CPU determines "Yes" at the step 930, the CPU proceeds with the process to the step 935 to execute an engine start control routine shown by a flowchart in FIG. 15.

Figure 15:
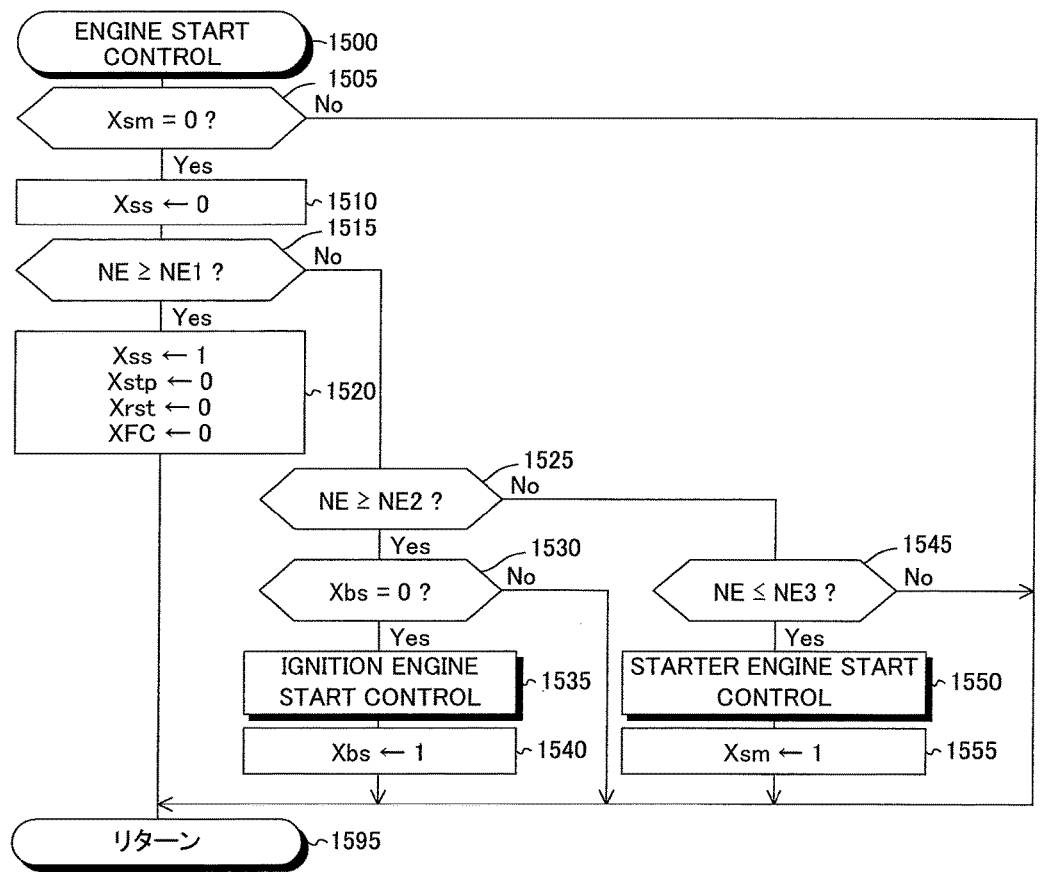
FIG. 15 shows a flow chart showing an engine start routine executed by the CPU shown in FIG. 1.

Therefore, at a predetermined timing, the CPU starts a process from a step 1500 of FIG. 15 and then, proceeds with the process to a step 1505 to determine whether or not the value of a starter engine start flag Xsm is "0". As described later, the value of the starter engine start flag Xsm is set to "1" when the starter engine start control is started.

Therefore, now, the value of the starter engine start flag Xsm is "0" and thus, the CPU determines "Yes" at the step 1505 and proceeds with the process to a step 1510 to set the value of the engine start completion flag Xss to "0". It should be noted that when the value of the starter engine start flag Xsm is "1", the CPU determines "No" at the step 1505 and then, proceeds with the process directly to a step 1595 to proceed with the process to the step 995 of FIG. 9 via the step 1595.

When the CPU proceeds with the process to the step 1515, the CPU determines whether or not the engine speed NE is equal to or larger than the first engine speed NE1. When the engine speed NE is equal to or larger than the first engine speed NE1, the CPU determines "Yes" at the step 1515 and then, proceeds with the process to a step 1520 to execute following processes (A) to (D). Then, the CPU proceeds with the process to the step 995 of FIG. 9 via the step 1595 to terminate this routine once.

(A) The CPU sets the value of the engine start completion flag Xss to "1". In other words, the CPU determines that the engine start is completed.

(B) The CPU sets the value of the engine stop request flag Xstp to "0".

(C) The CPU sets the value of the engine start request flag Xrst to "0".

(D) The CPU sets the value of the fuel-cut flag XFC to "0".

Figure 9:
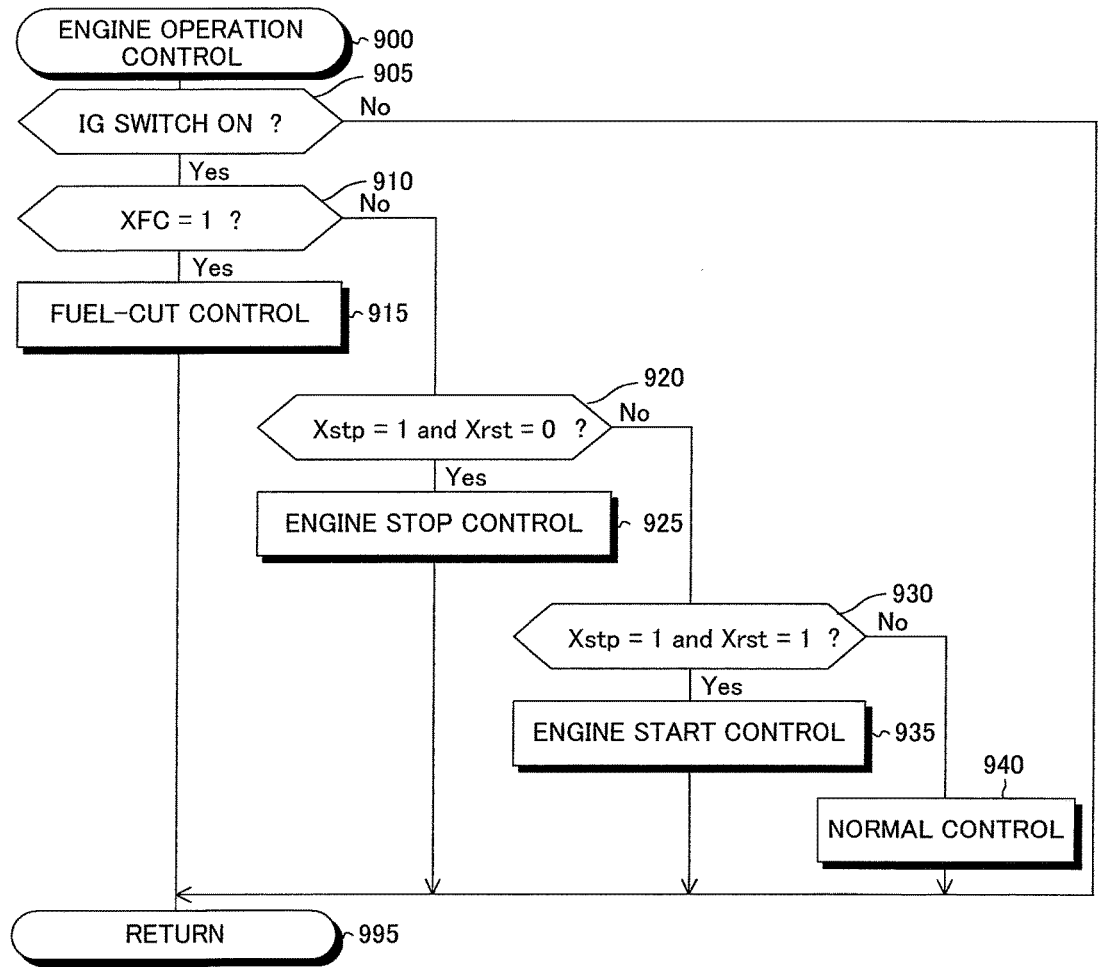
FIG. 9 shows a flow chart showing an engine operation control routine executed by the CPU shown in FIG. 1.

As a result, after the CPU next starts the process of the routine shown in FIG. 9, the CPU determines "No" at the step 910, 920 and 930, respectively and then, proceeds with the process to the step 940. As a result, the engine start is realized by the normal control.

On the other hand, when the engine speed NE is smaller than the first engine speed NE1 upon the execution of the process of the step 1515 by the CPU, the CPU determines "No" at the step 1515 and then, proceeds with the process to a step 1525 to determine whether or not the engine speed NE is equal to or larger than the second engine speed NE2.

When the engine speed NE is equal to or larger than the second engine speed NE2 upon the execution of the process of the step 1525 by the CPU, the CPU determines "Yes" at the step 1525 and then, proceeds with the process to a step 1530 to determine whether or not the value of an ignition engine start flag Xbs is "0". As described later, the value of the ignition engine start flag Xbs is set to "1" when the ignition engine start control is started.

Therefore, now, the value of the ignition engine start flag Xbs is "0". Thus, the CPU determines "Yes" at the step 1530 and then, proceeds with the process to a step 1535 to execute an ignition engine start control routine shown by a flowchart in FIG. 16. It should be noted that when the value of the ignition engine start flag Xbs is "1" upon the execution of the process of the step 1530 by the CPU, the CPU determines "No" at the step 1530 and then, proceeds with the process to the step 995 of FIG. 9 via the step 1595 to terminate this routine once.

Figure 16:
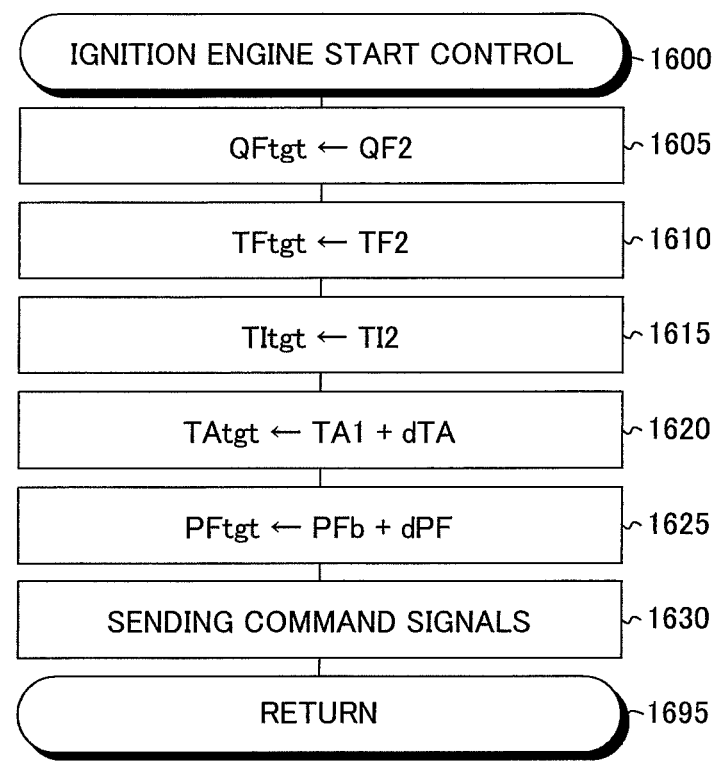
FIG. 16 shows a flow chart showing an ignition engine start control routine executed by the CPU shown in FIG. 1.

When the CPU proceeds with the process to the step 1535, the CPU starts a process from a step 1600 of FIG. 16 and then, sequentially executes processes of steps 1605 to 1630 described below. Then, the CPU proceeds with the process to a step 1540 of FIG. 15 via a step 1695.

Step 1605: The CPU sets a second injection amount QF2 as the target injection amount QFtgt. The second injection amount QF2 is acquired in advance by an experiment and is stored in the ROM. It should be noted that the second injection amount QF2 may be a value which increases as the cooling water temperature THW decreases.

Step 1610: The CPU sets a second injection timing TF2 as the target injection timing TFtgt. The second injection timing TF2 is a timing in the first half of the combustion stroke in the cylinder in which the ignition engine start control is executed. The second injection timing TF2 is acquired in advance by an experiment and is stored in the ROM.

Step 1615: The CPU sets a second ignition timing TI2 as the target ignition timing TItgt. The second ignition timing TI2 is a timing immediately after the second injection timing TF2 set as the target injection timing TFtgt at the step 1610. The second ignition timing TI2 is acquired in advance by an experiment and is stored in the ROM.

Step 1620: The CPU sets a value obtained by adding a predetermined value dTA to the first opening degree TA1 as the target throttle valve opening degree TAtgt (TAtgt=TA1+dTA).

Figure 4:
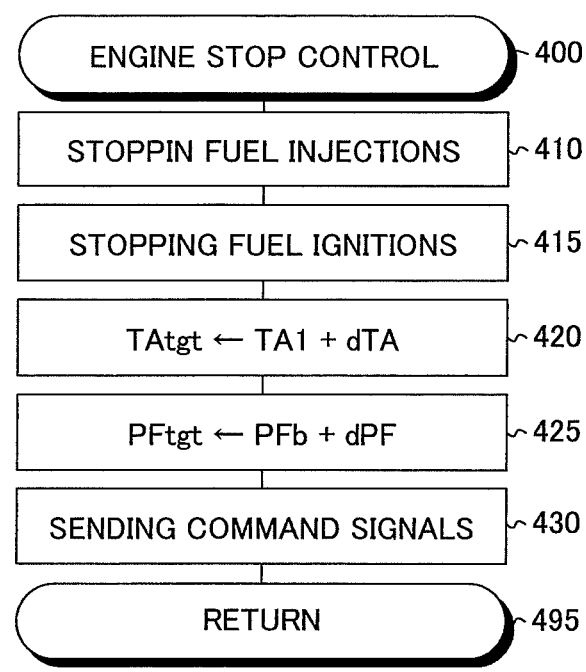
FIG. 4 shows a flow chart showing an engine stop control routine executed by a CPU shown in FIG. 1.

It should be noted that the engine stop control is executed until the engine start condition is satisfied and during the execution of the engine stop control, an opening degree larger than the first opening degree TA1 by the predetermined value dTA is set as the target throttle valve opening degree TAtgt (see the step 420 of FIG. 4). Therefore, according to this step 1620, the target throttle valve opening degree TAtgt is maintained at the target throttle valve opening degree TAtgt set by the engine stop control executed until the engine start condition is satisfied.

Step 1625: The CPU sets a value obtained by adding a predetermined value dPF to the base fuel pressure PFb as the target fuel pressure PFtgt (PFtgt=PFb+dPF).

It should be noted that as described above, the engine stop control is executed until the engine start condition is satisfied and during the execution of the engine stop control, a fuel pressure higher than the base fuel pressure PFb by the predetermined value dPF is set as the target fuel pressure PFtgt (see the step 425 of FIG. 4). Therefore, according to this step 1625, the target fuel pressure PFtgt is maintained at the target fuel pressure PFtgt set by the engine stop control executed until the engine start condition is satisfied.

Step 1630: The CPU sends command signals to the fuel injector 39 of the particular cylinder, the ignition device 35 of the particular cylinder, the throttle valve actuator 45a and the high pressure fuel pump 62 in accordance with the target injection amount QFtgt, the target injection timing TFtgt, the target ignition timing TItgt, the target throttle valve opening degree TAtgt and the target fuel pressure PFtgt set at the steps 1605 to 1625, respectively.

Thereby, while the throttle valve opening degree TA and the fuel pressure PF are controlled to the target throttle valve opening degree TAtgt and the target fuel pressure PFtgt, respectively, the target injection amount QFtgt of the fuel is injected from the fuel injector 39 at the target injection timing TFtgt set as a timing in the first half of the combustion stroke and the fuel is ignited by the ignition device 35 at the target ignition timing TItgt set as a timing immediately after the target injection timing TFtgt.

Then, the CPU proceeds with the process to the step 1540 of FIG. 15 via the step 1695 to set the ignition engine start flag Xbs to "1". Therefore, when the CPU next proceeds with the process to the step 1530, the CPU does not execute the process of the step 1535 and thus, the ignition engine start control is not executed.

Then, the CPU proceeds with the process to the step 995 of FIG. 9 via the step 1595.

On the other hand, when the engine speed NE is smaller than the second engine speed NE2 upon the execution of the process of the step 1525 of FIG. 15 by the CPU, the CPU determines "No" at the step 1525 and then, proceeds with the process to a step 1545 to determine whether or not the engine speed NE is equal to or smaller than the third engine speed NE3.

When the engine speed NE is larger than the third engine speed NE3 upon the execution of the process of the step 1545 by the CPU, the CPU determines "No" at the step 1545 and then, proceeds with the process to the step 995 of FIG. 9 via the step 1595 to terminate this routine once.

Figure 17:
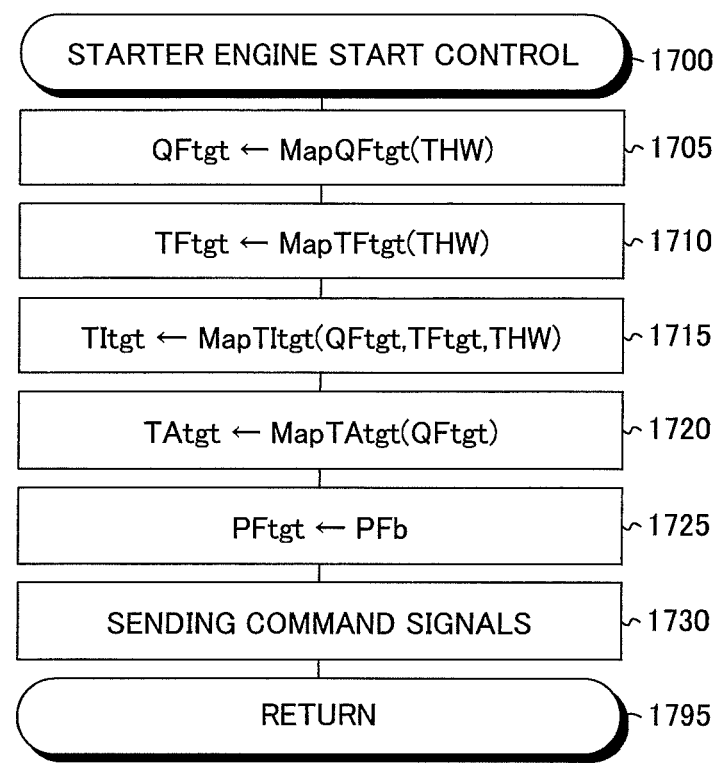
FIG. 17 show a flow chart showing a starter engine start control routine executed by the CPU shown in FIG. 1.

On the other hand, when the engine speed NE is equal to or smaller than the third engine speed NE3 upon the execution of the process of the step 1545 by the CPU, the CPU determines "Yes" at the step 1545 and then, proceeds with the process to a step 1550 to execute a starter engine start control routine shown by a flowchart in FIG. 17.

Therefore, when the CPU proceeds with the process to the step 1550, the CPU starts a process from a step 1700 of FIG. 17 and then, sequentially executes processes of steps 1705 to 1730 described later. Then, the CPU proceeds with the process to a step 1555 of FIG. 15 via a step 1795.

Step 1705: The CPU applies the cooling water temperature THW to a lookup table MapQFtgt(THW) to acquire a target injection amount QFtgt. According to this table MapQFtgt(THW), the acquired target injection amount QFtgt decreases as the cooling water temperature THW increases. In particular, as the cooling water temperature THW increases, the temperature of the combustion chamber 25 increases. Thus, the injected fuel is likely to vaporize and as a result, a sufficient explosive power can be obtained from a small amount of the injected fuel. For this reason, as the cooling water temperature THW increases, the acquired target injection amount QFtgt decreases.

Step 1710: The CPU applies the cooling water temperature THW to a lookup table MapTFtgt(THW) to acquire a target injection timing TFtgt. According to this table MapTFtgt(THW), as the cooling water temperature THW increases, the acquired target injection timing TFtgt moves toward the compression top dead center in the latter half of the compression stroke. In particular, as the cooling water temperature THW increases, the temperature of the combustion chamber 25 increases and thus, a time necessary for sufficiently vaporizing the injected fuel is short. For this reason, as the cooling water temperature THW increases, the acquired target injection timing TFtgt moves toward the compression top dead center in the latter half of the compression stroke.

Step 1715: The CPU applies the target injection amount QFtgt and the target injection timing TFtgt acquired at the steps 1705 and 1710, respectively and the cooling water temperature THW to a lookup table MapTItgt(QFtgt,TFtgt,THW) to acquire a target ignition timing TItgt. According to this table MapTItgt(QFtgt,TFtgt,THW), as the target injection amount QFtgt increases, the acquired target ignition timing TItgt delays. Further, as the target injection timing TFtgt advances, the acquired target ignition timing TItgt advances. Furthermore, as the cooling water temperature THW increases, the acquired target ignition timing TItgt advances.

In particular, as the fuel injection amount increases, a time for causing the fuel to vaporize sufficiently is long. For this reason, as the target injection amount QFtgt increases, the acquired target ignition timing TItgt delays.

Further, as the target injection timing TFtgt advances, the fuel sufficiently vaporizes at an early timing. For this reason, as the target injection timing TFtgt advances, the acquired target ignition timing TItgt advances.

Furthermore, as the cooling water temperature THW increases, a time for causing the fuel to vaporize sufficiently is short. For this reason, as the cooling water temperature THW increases, the acquired target ignition timing TIgt advances.

Step 1720: The CPU applies the target injection amount QFtgt to a lookup table MapTAtgt(QFtgt) to acquire a target throttle valve opening degree TAtgt. According to this table MapTAtgt(QFtgt), the target throttle valve opening degree TAtgt is acquired as a value for causing the air-fuel ratio of a mixture gas formed in each of the cylinders to be a predetermined air-fuel ratio (in this example, an air-fuel ratio smaller (i.e., richer) than the stoichiometric air-fuel ratio). The acquired target throttle valve opening degree TAtgt increases as the target injection amount QFtgt increases.

Step 1725: The CPU sets the base fuel pressure PFb as the target fuel pressure PFtgt.

Step 1730: The CPU sends command signals to the fuel injectors 39, the ignition devices 35, the throttle valve actuator 45a and the high pressure fuel pump 62 in accordance with the target injection amount QFtgt, the target injection timing TFtgt, the target injection timing TItgt, the target throttle valve opening degree TAtgt and the target fuel pressure PFtgt set at the steps 1705 to 1725, respectively and sends a command signal to the starter motor 26.

Thereby, while the throttle valve opening degree TA and the fuel pressure PF are controlled to the target throttle valve opening degree TAtgt and the target fuel pressure PFtgt, respectively and a rotation torque is applied to the crank shaft 24 by the starter motor 26, the target injection amount QFtgt of the fuel is injected from each of the fuel injectors 39 at the target injection timing TFtgt set as a timing in the latter half of the compression stroke and the fuel is ignited by the respective ignition devices 35 at the target injection timing TItgt set as a timing around the compression top dead center immediately after the fuel injection.

Then, the CPU proceeds with the process to the step 1555 of FIG. 15 via a step 1795 to set the value of the starter engine start flag Xsm to "1".

Then, the CPU proceeds with the process to the step 995 of FIG. 9 via the step 1595 to terminate this routine once.

<Engine Start Completion Determination by Control Device>

Figure 18:
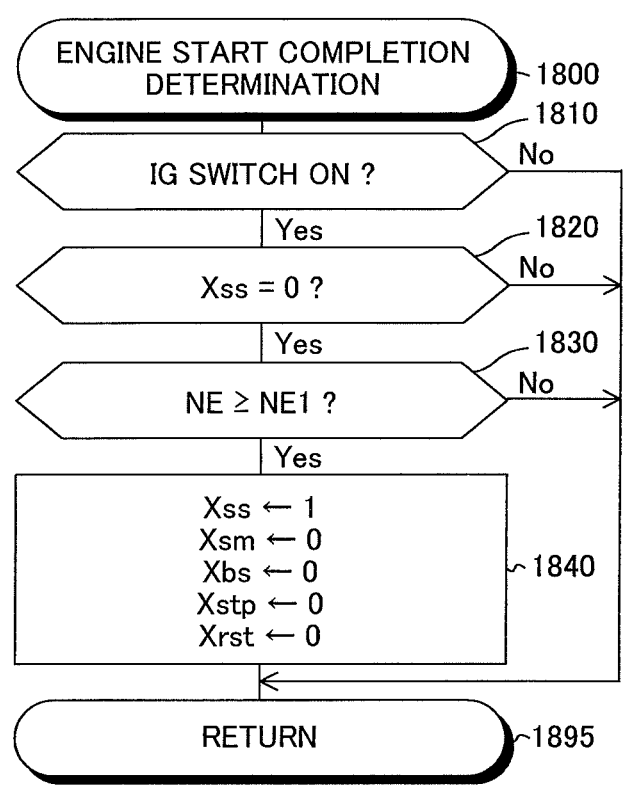
FIG. 18 shows a flow chart showing an engine start completion determination routine executed by the CPU shown in FIG. 1.

Further, the CPU is configured or programmed to execute an engine start completion determination routine shown by a flowchart in FIG. 18 every an elapse of a predetermined time period. Therefore, at a predetermined timing, the CPU starts a process from a step 1800 of FIG. 18 and then, proceeds with the process to a step 1810 to determine whether or not the state of the ignition switch 79 corresponds to the on-state.

When the state of the ignition switch 79 corresponds to the off-state upon the execution of the process of the step 1810 by the CPU, the CPU determines "No" at the step 1810 and then, proceeds with the process to a step 1895 to terminate this routine once.

On the other hand, when the state of the ignition switch 79 corresponds to the on-state upon the execution of the process of the step 1810 by the CPU, the CPU determines "Yes" at the step 1810 and then, proceeds with the process to a step 1820 to determine whether or not the value of the engine start completion flag Xss is "0". The engine start completion flag Xss indicates whether or not the engine start is completed after the satisfaction of the engine start condition and indicates that the engine start has not been completed when the value of the engine start completion flag Xss is "0".

When the value of the engine start completion flag Xss is "1" upon the execution of the process of the step 1820 by the CPU, the CPU determines "No" at the step 1820 and then, proceeds with the process to the step 1895 to terminate this routine once.

On the other hand, when the value of the engine start completion flag Xss is "0" upon the execution of the process of the step 1820 by the CPU, the CPU determines "Yes" at the step 1820 and then, the proceeds with the process to a step 1830 to determine whether or not the engine speed NE is equal to or larger than the first engine speed NE1. When the engine speed NE is equal to or larger than the first engine speed NE1, it can be determined that the engine start is completed. Therefore, in this case, the CPU determines "Yes" at the step 1830 and then, proceeds with the process to a step 1840 to execute following processes (A) to (E). Then, the CPU proceeds with the process to the step 1895 to terminate this routine once.

(A) The CPU sets the value of the engine start completion flag Xss to "1".

(B) The CPU sets the value of the starter engine start flag Xsm to "0".

(C) The CPU sets the value of the ignition engine start flag Xbs to "0".

(D) The CPU sets the value of the engine stop request flag Xstp to "0".

(E) The CPU sets the value of the engine start request flag Xrst to "0".

As a result, after the CPU starts the engine operation control routine shown in FIG. 9, the CPU proceeds with the process to the step 940 of FIG. 9. Thus, the normal control is executed.

It should be noted that the present invention is not limited to the aforementioned embodiment and various modifications can be employed within the scope of the present invention. For example, in the fuel pressure decrease control according to the aforementioned embodiment, as far as the additional fuel can be discharged to the exhaust passage along with the combustion gas, the additional injection may be carried out immediately after or before the completion of the combustion of the first fuel instead of the additional injection carried out upon the completion of the combustion of the first fuel.

Further, the volume of the delivery pipe 64 is known and thus, the fuel injection amount capable of decreasing the pressure of the fuel (i.e., the fuel pressure) in the delivery pipe 64 to below the permissible fuel pressure PFp can be acquired by the calculation on the basis of the fuel pressure PF. Therefore, in the fuel pressure decrease control according to the aforementioned embodiment, the total injection amount QFt may be acquired by the calculation without using the lookup table MapQFt(PF).

Further, when the ignition device 35 is a type of an ignition device capable of measuring an ion current derived from the combustion of the fuel by applying a voltage to an electrode part of the ignition plug 37, a status of progress of the combustion of the first fuel can be acquired on the basis of the measured ion current. Therefore, in the fuel pressure decrease control according to the aforementioned embodiment, a timing for carrying out the additional injection can be determined on the basis of the detected timing of completion of the combustion of the first fuel on the basis of the status of the progress of the combustion of the first fuel acquired on the basis of the ion current.

Otherwise, when the engine 10 includes pressure sensors for detecting pressures in the respective combustion chambers 25 (i.e., in-cylinder presser sensors), the status of the progress of the combustion of the first fuel can be acquired on the basis of a pressure in the combustion chamber 25 (i.e., an in-cylinder pressure) detected by the in-cylinder sensor. Therefore, in the fuel pressure decrease control according to the aforementioned embodiment, a timing for carrying out the additional injection may be determined on the basis of the detected timing of the completion of the combustion of the first fuel on the basis of the status of the progress of the combustion of the first fuel acquired on the basis of the in-cylinder pressure.

Further, in the fuel pressure decrease control according to the aforementioned embodiment, the ignitions of the fuel may be continuously carried out by the ignition device 35 instead of only one ignition of the fuel by the ignition device 35.

Further, in the fuel pressure decrease control according to the aforementioned embodiment, it can be presumed that the rapid discharge of the combustion gas to the exhaust passage is preferred in order to cause the additional fuel to be discharged to the exhaust passage assuredly along with the combustion gas. Therefore, it may be preferred that the first injection amount QFi of the fuel is injected from the fuel injector 39 by one first injection. However, in the fuel pressure decrease control according to the aforementioned embodiment, when it is preferred that the first injection amount QFi of the fuel is injected from the fuel injector 39 by the fuel injections, the first injection amount QFi of the fuel may be injected from the fuel injector 39 by the fuel injections.

Similarly, it may be preferred that the additional injection amount QFa of the fuel is injected from the fuel injector 39 by one additional injection in order to discharge the additional fuel to the exhaust passage assuredly along with the combustion gas. However, in the fuel pressure decrease control according to the aforementioned embodiment, when it is preferred that the additional injection amount QFa of the fuel is injected from the fuel injector 39 by the fuel injections, the additional injection amount QFa of the fuel may be injected from the fuel injector 39 by the fuel injections.

Further, in the fuel pressure decrease control according to the aforementioned embodiment, when the first injection amount QFi acquired at the step 830 of FIG. 8 is equal to or larger than the total injection amount QFt, the first injection amount QFi is limited to the total injection amount QFt. In this case, the additional injection amount QFa is "0". In other words, the fuel pressure PF can be decreased to the permissible fuel pressure PFp only by the first injection.

Further, the engine 10, to which the present invention is applied, may include an oxidation catalyst in the exhaust pipe 52 instead of the three-way catalyst 53.

Further, the engine 10, to which the present invention is applied, may be configured to continue the fuel ignition to treat the unburned fuel remaining in the combustion chamber 25 without stopping the fuel ignition at the same time as the satisfaction of the engine stop condition and when a constant time elapses after the engine stop condition is satisfied, stops the fuel ignition.

Further, the engine 10, to which the present invention is applied, may be configured to stop the engine operation even when the state of the ignition switch 79 corresponds to the on-state upon the satisfaction of a predetermined condition other than the condition (the engine stop condition) that the brake pedal 92 is depressed and the vehicle speed SPD is equal to or smaller than the predetermined vehicle speed SPDth.

Further, the engine 10, to which the present invention is applied, may be configured to start the operation of the engine 10 by a control other than the ignition engine start control, for example, by the starter engine start control even when the engine speed NE is smaller than the first engine speed NE1 and is equal to or larger than the second engine speed NE2 upon request of restart of the engine operation during the execution of the engine stop control.

Further, the engine 10, to which the present invention is applied, may be configured to start the operation of the engine 10 by the ignition engine start control after the engine speed NE is caused to be zero by the engine stop control.

Further, the engine 10, to which the present invention is applied, may be configured not to execute a fuel pressure increase control for increasing the fuel pressure PF when the engine stop condition is satisfied.

Further, the engine 10, to which the present invention is applied, may be configured to execute the fuel pressure decrease control, independently of whether or not the fuel pressure PF is higher than the permissible fuel pressure PFp when the state of the ignition switch 79 is changed from the on-state to the off-state.

Further, the engine 10, to which the present invention is applied, may be configured not to execute the engine stop control. In this case, the fuel pressure decrease control is executed when the state of the ignition switch 79 is changed from the on-state to the off-state and then, the engine operation stops.

What is claimed is:

1. A control device of a vehicle, comprising:
   a multi-cylinder internal combustion engine having,
      at least two combustion chambers,
      at least two fuel injectors provided corresponding to the combustion chambers, respectively, each of the fuel injectors injecting fuel directly into the corresponding combustion chamber,
      at least two ignition devices provided corresponding to the combustion chambers, respectively, each of the ignition devices including an ignition plug,
      at least two intake valves provided corresponding to the combustion chambers, respectively,
      at least two exhaust valves provided corresponding to the combustion chambers, respectively, and
      an exhaust passage connected to the combustion chambers;
   an ignition switch; and
   a catalyst provided in the exhaust passage, the catalyst having an oxidation function,
   the control device comprising a control section for controlling fuel injections carried out by the fuel injectors and fuel ignitions carried out by the ignition devices,
   wherein the control section is configured to execute a first control when a particular execution condition is satisfied, the particular execution condition being a condition that a state of the ignition switch has been changed from an on-state to an off-state and a rotation of the engine has stopped, and the first control being a control for causing the fuel injector to inject fuel into the combustion chamber of a particular cylinder in which the intake valve is closed and the exhaust valve is open and causing the ignition device to ignite the fuel.

2. The control device of the vehicle as set forth in claim 1, wherein the vehicle further comprises a brake pedal, and the control section is configured:
   to execute an engine stop control for causing the fuel injectors to stop injections of fuel to stop a rotation of the engine when an engine stop condition is satisfied, the engine stop condition being a condition that the state of the ignition switch corresponds to the on-state, the brake pedal is depressed and a speed of the vehicle is equal to or smaller than a predetermined speed; and
   to determine that the particular execution condition is satisfied when the state of the ignition switch is changed from the on-state to the off-state after the rotation of the engine stops.

3. The control device of the vehicle as set forth in claim 2, wherein the control section is configured:
   to start an operation of the engine by causing the fuel injector to inject fuel into the combustion chamber of a cylinder, a stroke of which corresponds to a combustion stroke, and the ignition device to ignite the fuel when a start of the operation of the engine is requested after the engine stop control is started and before the rotation of the engine stops; and
   to execute a fuel pressure increase control for increasing a fuel pressure when the engine stop condition is satisfied, the fuel pressure being a pressure of fuel supplied to the fuel injectors.

4. The control device of the vehicle as set forth in claim 2, wherein the control section is configured to execute the first control to cause the fuel injector to inject an amount of fuel determined on the basis of an amount of air in the combustion chamber of the particular cylinder.

5. The control device of the vehicle as set forth in claim 1, wherein the control section is configured:
   to execute the first control when the particular execution condition is satisfied and a fuel pressure, which is a pressure of the fuel supplied to the fuel injectors, is higher than a permissible fuel pressure; and
   not to execute the first control when the particular execution condition is satisfied and the fuel pressure is equal to or lower than the permissible fuel pressure.

6. The control device of the vehicle as set forth in claim 1, wherein the control section is configured to execute a second control when the control section predicts that the fuel pressure after the execution of the first control is higher than a permissible fuel pressure, the second control being a control for causing the fuel injector to inject an amount of the fuel capable of decreasing the fuel pressure to below the permissible fuel pressure at a predetermined timing capable of causing the fuel injected from the fuel injector by the first control to move into a flow of a combustion gas produced by burning of the fuel to the exhaust passage without blowing off the burning of the fuel.

7. The control device of the vehicle as set forth in claim 6, wherein the control section is configured to determine, as the predetermined timing, a timing within a particular period including a timing of completion of the burning of the fuel injected from the fuel injector by the first control.

* * * * *